(12) United States Patent
Haddock et al.

(10) Patent No.: US 9,530,916 B2
(45) Date of Patent: Dec. 27, 2016

(54) CORRUGATED PANEL MOUNTING BRACKET

(76) Inventors: Robert M. M. Haddock, Colorado Springs, CO (US); Dustin M. M. Haddock, Colorado Springs, CO (US)

( * ) Notice: Subject to any disclaimer, the term of this patent is extended or adjusted under 35 U.S.C. 154(b) by 0 days.

(21) Appl. No.: 14/005,784

(22) PCT Filed: Mar. 15, 2012

(86) PCT No.: PCT/US2012/029160
§ 371 (c)(1),
(2), (4) Date: Jun. 13, 2014

(87) PCT Pub. No.: WO2012/129039
PCT Pub. Date: Sep. 27, 2012

(65) Prior Publication Data
US 2014/0311553 A1    Oct. 23, 2014

Related U.S. Application Data

(60) Provisional application No. 61/454,011, filed on Mar. 18, 2011.

(51) Int. Cl.
*H01L 31/042*    (2014.01)
*E04F 13/08*    (2006.01)
(Continued)

(52) U.S. Cl.
CPC ....... *H01L 31/0422* (2013.01); *E04F 13/0817* (2013.01); *E04F 13/0828* (2013.01);
(Continued)

(58) Field of Classification Search
CPC ........ F24J 2/5248; F24J 2/5249; F24J 2/5245; H02S 20/00; H02S 20/23; E04F 13/0817; E04F 13/0837; E04F 13/0828; Y02B 10/12; Y02E 10/47; E04D 3/3607
(Continued)

(56) References Cited

U.S. PATENT DOCUMENTS 4,656,794 A * 4/1987 Thevenin et al. ................. 52/22
4,674,252 A * 6/1987 Nicholas et al. .......... 52/396.06
(Continued)

FOREIGN PATENT DOCUMENTS

AU    2009245849    * 12/2009    ................ F24J 2/52
DE    202009010984 U1    12/2009
WO    2010140878 A2    12/2010

*Primary Examiner* — Joshua J Michener
*Assistant Examiner* — Alp Akbasli
(74) *Attorney, Agent, or Firm* — Marsh Fischmann & Breyfogle LLP

(57) ABSTRACT

A mounting bracket (210) for a corrugated panel (202) is disclosed. The mounting bracket (210) includes an upper wall (216) in the form of an at least substantially flat surface for supporting various types of attachments. This upper wall (216) is disposed above and spaced from a panel valley engagement section (232) for engaging a panel valley (208) of the corrugated panel (202). A panel crown engagement section (224) is positioned on each side of the panel valley engagement section (232) for engaging different panel crowns (204) of a corrugated panel (202). An attachment may be secured relative to the mounting bracket (210) utilizing a mounting hole (218) on the bracket upper wall (216).

26 Claims, 27 Drawing Sheets

(51) Int. Cl.
  *E04F 13/12* (2006.01)
  *F24J 2/52* (2006.01)
  *H02S 20/23* (2014.01)
(52) U.S. Cl.
  CPC ...... *E04F 13/0837* (2013.01); *E04F 13/0853* (2013.01); *E04F 13/0857* (2013.01); *E04F 13/12* (2013.01); *F24J 2/5245* (2013.01); *F24J 2/5249* (2013.01); *F24J 2/5258* (2013.01); *H02S 20/00* (2013.01); *H02S 20/23* (2014.12); *Y02B 10/12* (2013.01); *Y02E 10/47* (2013.01)
(58) Field of Classification Search
  USPC ............ 52/698, 715, 478, 202, 208, 506.06, 91.3,52/543, 546, 547, 548
  See application file for complete search history.

(56) References Cited

U.S. PATENT DOCUMENTS

| | | | | | |
|---|---|---|---|---|---|
| 4,773,791 | A | * | 9/1988 | Hartkorn | 404/68 |
| 5,152,107 | A | * | 10/1992 | Strickert | 52/24 |
| 5,164,020 | A | * | 11/1992 | Wagner et al. | 136/251 |
| 5,409,549 | A | * | 4/1995 | Mori | 136/244 |
| 5,715,640 | A | * | 2/1998 | Haddock | 52/545 |
| 5,787,653 | A | * | 8/1998 | Sakai et al. | 52/173.3 |
| 6,751,919 | B2 | * | 6/2004 | Calixto | 52/573.1 |
| 7,658,356 | B1 | * | 2/2010 | Nehls | 248/300 |
| 8,226,061 | B2 | * | 7/2012 | Nehls | 248/300 |
| 8,833,714 | B2 | * | 9/2014 | Haddock et al. | 248/237 |
| 2006/0174571 | A1 | * | 8/2006 | Panasik et al. | 52/478 |
| 2011/0272545 | A1 | * | 11/2011 | Liu | 248/222.14 |
| 2012/0325761 | A1 | * | 12/2012 | Kubsch et al. | 211/41.1 |

\* cited by examiner

CORRUGATED PANEL MOUNTING BRACKET

CROSS-REFERENCE TO RELATED APPLICATIONS

This patent application is a U.S. National Stage of PCT/US2012/029160, filed 15 Mar. 2012, which claims priority to and is a non-provisional application of U.S. Provisional Patent Application Ser. No. 61/454,011, that is entitled "CORRUGATED PANEL MOUNTING BRACKET," and that was filed on Mar. 18, 2011. The entire disclosure of each application set forth in this CROSS REFERENCE TO RELATED APPLICATIONS section is hereby incorporated by reference in its entirety herein.

FIELD OF THE INVENTION

The present invention generally relates to installing structures on a building surface and, more particularly, to a mounting bracket for use with corrugated panels.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time, and have been installed on various building roofs. A photovoltaic cell is typically incorporated into a perimeter frame of an appropriate material (e.g., aluminum) to define a photovoltaic module or solar cell module. Multiple photovoltaic modules may be installed in one or more rows (e.g., a string) on a roofing surface to define an array.

FIG. 1 illustrates one prior art approach that has been utilized to mount a solar cell module to a standing seam. A mounting assembly 10 includes a mounting device 74, a bolt 14, and a clamping member 142. Generally, the mounting device 74 includes a slot 90 that receives at least an upper portion of a standing seam 42. A seam fastener 106 is directed through the mounting device 74 and into the slot 90 to forcibly retain the standing seam 42 therein. This then mounts the mounting device 74 to the standing seam 42.

A threaded shaft 22 of the bolt 14 from the mounting assembly 10 passes through an unthreaded hole in a base 154 of a clamping member 142, and into a threaded hole 98 on an upper surface 78 of the mounting device 74. This then mounts the clamping member 142 to the mounting device 74. The clamping member 142 is used to interconnect a pair of different solar cell module frames 62 with the mounting assembly 10. In this regard, the clamping member 142 includes a pair of clamping legs 146, where each clamping leg 146 includes an engagement section 152 that is spaced from the upper surface 78 of the mounting device 74. The bolt 14 may be threaded into the mounting device 74 to engage a head 18 of the bolt with the base 154 of the clamping member 142. Increasing the degree of threaded engagement between the bolt 14 and the mounting device 74 causes the engagement sections 152 of the clamping legs 146 to engage the corresponding solar cell module frame 62 and force the same against the upper surface 78 of the mounting device 74.

SUMMARY

The present invention is directed to a mounting bracket for corrugated panels. This mounting bracket includes an upper wall having at least one mounting hole, at least one panel valley engagement section, and at least one panel crown engagement section. The mounting hole extends completely through the upper wall, and accommodates securing an attachment relative to the mounting bracket. When the mounting bracket is positioned on a corrugated panel: 1) each panel valley engagement section is positioned to engage a panel valley of the corrugated panel; and 2) each panel crown engagement section is positioned to engage a panel crown of the corrugated panel.

A number of feature refinements and additional features are applicable to the present invention. These feature refinements and additional features may be used individually or in any combination. Any feature of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a mounting bracket includes "a mounting hole" alone does not mean that the mounting bracket includes only a single mounting hole). Moreover, any failure to use phrases such as "at least one" also does not limit the corresponding feature to the singular (e.g., indicating that a mounting bracket includes "a mounting hole" alone does not mean that the mounting bracket includes only a single mounting hole). Use of the phrase "at least generally" or the like in relation to a particular feature encompasses the corresponding characteristic and insubstantial variations thereof (e.g., indicating that components are at least generally mirror image of each other encompasses the components being the mirror image of each other). Finally, a reference of a feature in conjunction with the phrase "in one embodiment" does not limit the use of the feature to a single embodiment.

The mounting bracket of the present invention is adapted for use with corrugated panels (e.g., panels having a sinusoidal configuration in an end view). Corrugated panels are typically fabricated from a metal or metal alloy of any appropriate type. A corrugated panel may be defined by a plurality of crowns and valleys, for instance where a panel valley is disposed between each adjacent pair of panel crowns (e.g., the panel crowns and panel valleys may be disposed in alternating relation). Typically a corrugated panel will be installed in a roofing application such that the length dimension of its crowns and valleys each extend along the roof pitch (e.g., the elevation of each crown and valley of the corrugated panel may continually change proceeding along their respective length dimension). A "crown" of a corrugated panel may also be referred to as a "rib" or "the high." A "valley" of a corrugated panel may also be referred to as a "trough" or "the low." As such, each panel valley engagement section of the mounting bracket could also be referred to as a "panel trough engagement section," while each panel crown engagement section of the mounting bracket could also be referred to as a "panel rib engagement section."

The portion of each panel valley engagement section that engages a corresponding panel valley may be spaced from a portion of each panel crown engagement section that engages a corresponding panel crown, where such a spacing or offset is in a vertical dimension when the mounting bracket is in an upright position. Such an "upright position" may be defined as when each panel valley engagement section and each panel crown engagement section of the mounting bracket is positioned on its own individual, horizontal reference surface. In a roofing application, the pitch of the roof may define the baseline for what is "upright" for purposes of the mounting bracket. For instance, the noted vertical dimension may be characterized as being the dimension that is orthogonal to the pitch of the roof.

The mounting bracket of the present invention may be of one-piece construction, where the mounting bracket lacks any joint of any kind between adjacent portions of the mounting bracket. In one embodiment, the entire mounting bracket is in the form of an extrusion, and which provides the noted one-piece construction. In any case, each of the upper wall, each panel valley engagement section, and each panel crown engagement section may be structurally interconnected in any appropriate manner. Moreover, the mounting bracket may be formed from any appropriate material or combination of materials, such as an appropriate metal alloy.

The mounting bracket may be characterized as having first and second ends. The spacing between these two ends may define a length dimension for the mounting bracket. When the mounting bracket is positioned on a corrugated panel, the length dimension of the mounting bracket may coincide with the length dimensions of the corrugated panel's crowns and valleys (e.g., the length dimension of the mounting bracket may be collinear or parallel with the length dimension of each crown and valley of the corresponding corrugated panel).

The upper wall of the mounting bracket may be characterized as extending between the first and second ends of the mounting bracket, and where the entirety of this upper wall is in the form of an at least substantially flat surface that incorporates at least one mounting hole. In one embodiment, a perimeter of this at least substantially flat surface of the bracket upper wall defines an area of at least 2.5 inches$^2$. The upper wall of the mounting bracket may also be characterized as defining an uppermost extreme of the mounting bracket when disposed in an upright position, where the entirety of this upper wall is in the form of an at least substantially flat surface that incorporates at least one mounting hole and where the perimeter of this surface encompasses an area of at least 2.5 inches$^2$.

The upper wall of the mounting bracket may include a single mounting hole (e.g., centered between the opposite ends of the mounting bracket). More than one mounting hole could be incorporated by the upper wall. Each such mounting hole in the upper wall extends completely through the entire thickness of the upper wall. Each mounting hole may be of any appropriate configuration (e.g., round; in the form of an elongated slot or a "slotted hole"). Finally, each mounting hole may be one of threaded or unthreaded.

Any appropriate attachment fastener (e.g., a threaded stud having at least one nut threaded thereon; a threaded bolt) may be directed at least into a particular mounting hole on the upper wall of the mounting bracket to secure an attachment of any appropriate type relative to the mounting bracket. The mounting bracket may include an open space directly below each mounting hole utilized by the upper wall to allow a free end of a corresponding attachment fastener to extend therein without contacting an internal structure of the mounting bracket (or a corrugated panel on which the mounting bracket is positioned). A given attachment fastener could be threadably engaged with the upper wall (e.g., by a corresponding mounting hole being threaded). Such a threaded attachment fastener could terminate within the wall thickness, or could extend completely through the entire thickness of the upper wall. A given attachment fastener could extend completely through a corresponding mounting hole without being threadably engaged with the upper wall. For instance, a nut could be threaded onto a portion of such an attachment fastener that extends beyond the upper wall.

The mounting bracket is supported on a corrugated panel on which it is positioned at a minimum of two locations—at the location of a panel crown engagement section and at the location of a panel valley engagement section. A first panel valley engagement section and a first panel crown engagement section of the mounting bracket could provide the entirety of the support for the mounting bracket on a corrugated panel.

One characterization of a first embodiment is that the mounting hole in the upper wall of the mounting bracket is aligned with a first panel valley engagement section in the vertical dimension when the mounting bracket is in an upright position. Another characterization of this first embodiment is that the upper wall of the mounting bracket is aligned with and spaced from a first panel valley engagement section in the vertical dimension when the mounting bracket is in an upright position. The following discussion pertains to this first embodiment of the present invention, up to the start of a discussion of a second embodiment of the present invention.

In the first embodiment, an underside of the upper wall and the first panel valley engagement section may be separated by a distance of at least about 1 inch, measured in the vertical dimension. A first open space may extend from the underside of the upper wall to the first panel valley engagement section. In the case where the vertical dimension defines what is "up" or "above" and what is "down" or "below," the first open space may be characterized as being disposed below the mounting hole in the upper wall.

The mounting bracket of the first embodiment again includes a first panel valley engagement section. The first panel valley engagement section may include a convex panel interface surface (e.g., a surface of the first panel valley engagement section that contacts a corrugated panel when the mounting bracket is positioned on a corrugated panel). The entirety of the interface between the first panel valley engagement section and a corrugated panel (when the mounting bracket is positioned on the corrugated panel) may be limited to this convex panel interface surface.

The mounting bracket of the first embodiment may be characterized as including a valley section, which in turn includes the noted upper wall. The entirety of the valley section of the mounting bracket could be in the form of the upper wall. In any case, the mounting bracket may include first and second legs that extend from opposite sides of the valley section. For instance, the first leg could extend toward a first crown of a corrugated panel on which the mounting bracket is positioned, while the second leg could extend toward a second crown of such a corrugated panel.

An included or interior angle between the upper wall (e.g., its underside) and the first leg may be greater than 90° in the case of the first embodiment. Similarly, an included or interior angle between the upper wall (e.g., its underside) and the second leg may be greater than 90°. The first and second legs may be oriented as the mirror image of each other (e.g., having the same magnitude for their respective included/interior angles).

The upper wall, along with the above-noted first and second legs of the mounting bracket, may collectively define a hollow interior in the case of the first embodiment. This hollow interior may be "under" the upper wall and the first and second legs when the mounting bracket is disposed in an upright position. In any case, the mounting bracket may further include third and fourth legs that are disposed within the hollow interior.

The above-noted third leg may extend from the first leg at least generally in the direction of the fourth leg, while the above-noted fourth leg may extend from the second leg at least generally in the direction of the third leg. Again, these third and fourth legs may be characterized as being disposed within a hollow interior of the mounting bracket (e.g., located within a space collectively defined by the upper wall and the first and second legs when the mounting bracket is disposed in an upright position). In one embodiment, the third and fourth legs intersect within the hollow interior of the mounting bracket to define the first panel valley engagement section, and this intersection is what engages a panel valley when the mounting bracket is positioned on a corrugated panel (e.g., the intersection may be in the form of the above-noted convex panel interface surface). An included or interior angle between the third and fourth legs may be less than 90°. The third and fourth legs may be oriented as the mirror image of each other (e.g., having the same magnitude for their respective included/interior angles).

The mounting bracket of the first embodiment may include first and second panel crown engagement sections. The above-noted first leg of the mounting bracket may be characterized as extending between the valley section (e.g., the upper wall) and the first panel crown engagement section, while the above-noted second leg of the mounting bracket may be characterized as extending between the valley section (e.g., the upper wall) and the second panel crown engagement section. For instance, one end of the first leg may adjoin the valley section, while an opposite end of the first leg may adjoin the first panel crown engagement section. Similarly, one end of the second leg may adjoin the valley section, while an opposite end of the second leg may adjoin the second panel crown engagement section. In any case, the first and second panel crown engagement sections may be the only two panel crown engagement sections utilized by the first embodiment of the present invention.

The mounting bracket of the first embodiment may be supported on the corrugated panel on which it is positioned at a minimum of three locations. For instance, the mounting bracket could utilize at least one panel valley engagement section (e.g., the noted first panel valley engagement section for the first embodiment), and at least two panel crown engagement sections (e.g., first and second panel crown engagement sections). When the mounting bracket is positioned on a corrugated panel and where the first panel valley engagement section engages a first panel valley of the corrugated panel, the noted first panel crown engagement section may engage a first panel crown of the corrugated panel on one side of this first panel valley, and the noted second panel crown engagement section may engage a second panel crown of the corrugated panel on the opposite side of this same first panel valley. The first and second panel crowns of the corrugated panel (engaged by the first and second panel crown engagement sections, respectively) could be the adjacent-most panel crowns to the first panel valley (engaged by the first panel valley engagement section). However, one or more panel crowns could be positioned between the first panel crown (engaged by the first panel crown engagement section) and the first panel valley (engaged by the first panel valley engagement section), one or more panel crowns could be positioned between the second panel crown (engaged by the second panel crown engagement section) and the first panel valley (engaged by the first panel valley engagement section), or both. In one arrangement, there is a single panel valley engagement section (the noted first panel valley engagement section) and a single panel crown engagement section positioned on each side thereof (the noted first and second panel crown engagement sections).

The mounting bracket of the first embodiment could also utilize at least two panel valley engagement sections (e.g., the noted first panel valley engagement section for the first embodiment, along with a second panel valley engagement section), and at least one panel crown engagement section (e.g., a first panel crown engagement section). When the mounting bracket is positioned on a corrugated panel and where the first panel crown engagement section engages a first panel crown of the corrugated panel, the noted first panel valley engagement section may engage a first panel valley of the corrugated panel on one side of this first panel crown, and the noted second panel valley engagement section may engage a second panel valley of the corrugated panel on the opposite side of this same first panel crown. The first and second panel valleys of the corrugated panel (engaged by the first and second panel valley engagement sections, respectively) could be the adjacent-most panel valleys to the first panel crown (engaged by the first panel crown engagement section). However, one or more panel valleys could be positioned between the first panel valley (engaged by the first panel valley engagement section) and the first panel crown (engaged by the first panel crown engagement section), one or more panel valleys could be positioned between the second panel valley (engaged by the second panel valley engagement section) and the first panel crown (engaged by the first panel crown engagement section), or both. In one arrangement, there is a single panel crown engagement section (the noted first panel crown engagement section) and a single panel valley engagement section positioned on each side thereof (the noted first and second panel valley engagement sections). In another arrangement, there are at least three panel crown engagement sections (the noted first panel crown engagement section, along with second and third panel crown engagement sections), and there are at least two panel valley engagement sections (the noted first and second panel valley engagement sections), where the first panel crown engagement section again is located between the first and second panel valley engagement sections, where the first panel valley engagement section is located between the second and first panel crown engagement sections, and where the second panel valley engagement section is positioned between the first and third panel crown engagement sections.

With further regard to the case where the mounting bracket of the first embodiment utilizes at least two panel valley engagement sections (the noted first and second panel valley engagement sections) and at least one panel crown engagement section (the noted first panel crown engagement section), the mounting bracket may further an additional upper wall for each additional panel valley engagement section. The relationships described in the first embodiment between the first panel valley engagement section and the upper wall are equally applicable to each additional panel valley engagement section and its corresponding upper wall. As such, the first embodiment of the mounting bracket of the present invention may actually incorporate at least two laterally-spaced upper walls to facilitate securing one or more attachments relative to the mounting bracket.

One characterization of a second embodiment of the present invention is that the mounting hole in the upper wall of the mounting bracket is aligned with a first panel crown engagement section in the vertical dimension when the mounting bracket is in an upright position. Another characterization of this second embodiment is that the upper wall of the mounting bracket is aligned with and spaced from a first panel crown engagement section in the vertical dimension when the mounting bracket is in an upright position. The following discussion pertains at least to this second embodiment of the present invention unless otherwise noted.

An underside of the upper wall and the first panel crown engagement section in the second embodiment may be separated by a distance of at least about ½ inch, measured in the vertical dimension. A first open space may extend from the underside of the upper wall to the first panel crown engagement section. In the case where the vertical dimension defines what is "up" or "above" and what is "down" or "below," the first open space may be characterized as being disposed below the mounting hole in the upper wall.

The upper wall in the case of the second embodiment may include at least one bracket fastener hole. The first panel crown engagement section may include a separate bracket fastener hole for each bracket fastener hole in the upper wall. In one embodiment, the upper wall of the mounting bracket includes first and second bracket fastener holes (e.g., with the mounting hole being located between the first and second bracket fastener holes), and the first panel crown engagement section includes third and fourth bracket fastener holes, where the first bracket fastener hole (upper wall) is vertically aligned with the third bracket fastener hole (first panel crown engagement section), and where the second bracket fastener hole (upper wall) is vertically aligned with the fourth bracket fastener hole (first panel crown engagement section). Each bracket fastener hole in the upper wall and the first panel crown engagement section may be unthreaded. A bracket fastener may be directed through a bracket fastener hole in the upper wall, through an aligned bracket fastener hole in the first panel crown engagement section, and through the corresponding crown of a corrugated panel on which the mounting bracket of this second embodiment is positioned.

The second embodiment of the mounting bracket may be characterized as including a crown section, which in turn includes both the upper wall and the first panel crown engagement section. In this regard, the mounting bracket may include first and second panel valley engagement sections that extend from opposite sides of the crown section. For instance, the first panel valley engagement section could extend toward a first panel valley of a corrugated panel on which the mounting bracket is positioned, while the second panel valley engagement section could extend toward a second panel valley of such a corrugated panel. The first and second panel engagement sections may be oriented as the mirror image of each. A free end of each of the first and second panel engagement sections may be convexly-shaped to engage a corresponding panel valley of a corrugated panel on which the mounting bracket is positioned.

The mounting bracket of the noted second embodiment could utilize at least one panel crown engagement section (e.g., the noted first panel crown engagement section for the second embodiment), and at least two panel valley engagement sections (e.g., first and second panel valley engagement sections) to support the mounting bracket on a corrugated panel at a minimum of three locations. When the mounting bracket is positioned on a corrugated panel and where the first panel crown engagement section engages a first panel crown of the corrugated panel, the noted first panel valley engagement section may engage a first panel valley of the corrugated panel on one side of this first panel crown, and the noted second panel valley engagement section may engage a second panel valley of the corrugated panel on the opposite side of this same first panel crown. The first and second panel valleys of the corrugated panel (engaged by the first and second panel valley engagement sections, respectively) could be the adjacent-most panel valleys to the first panel crown (engaged by the first panel crown engagement section). However, one or more panel valleys could be positioned between the first panel valley (engaged by the first panel valley engagement section) and the first panel crown (engaged by the first panel crown engagement section), one or more panel valleys could be positioned between the second panel valley (engaged by the second panel valley engagement section) and the first panel crown (engaged by the first panel crown engagement section), or both. In one arrangement, there is a single panel crown engagement section (the noted first panel crown engagement section) and a single panel valley engagement section positioned on each side thereof (the noted first and second panel valley engagement sections).

The mounting bracket of the noted second embodiment could also utilize at least one panel valley engagement section (e.g., a first panel valley engagement section), and at least two panel crown engagement sections (e.g., the noted first panel engagement section for the second embodiment, along with a second panel crown engagement section) to support the mounting bracket on a corrugated panel at a minimum of three locations. When the mounting bracket is positioned on a corrugated panel and where the first panel valley engagement section engages a first panel valley of the corrugated panel, the noted first panel crown engagement section may engage a first panel crown of the corrugated panel on one side of this first panel valley, and the noted second panel crown engagement section may engage a second panel crown of the corrugated panel on the opposite side of this same first panel valley. The first and second panel crowns of the corrugated panel (engaged by the first and second panel crown engagement sections, respectively) could be the adjacent-most panel crowns to the first panel valley (engaged by the first panel valley engagement section). However, one or more panel crowns could be positioned between the first panel crown (engaged by the first panel crown engagement section) and the first panel valley (engaged by the first panel valley engagement section), one or more panel crowns could be positioned between the second panel crown (engaged by the second panel crown engagement section) and the first panel valley (engaged by the first panel valley engagement section), or both. In one arrangement, there is a single panel valley engagement section (the noted first panel valley engagement section) and a single panel crown engagement section positioned on each side thereof (the noted first and second panel crown engagement sections). The first panel valley engagement section could be interconnected with each of the first and second panel crown engagement sections. In another arrangement, there are at least three panel valley engagement sections (the noted first panel valley engagement section, along with second and third panel valley engagement sections), and at least two panel crown engagement sections (the noted first and second panel crown engagement sections), where the first panel valley engagement section again is located between the first and second panel crown engagement sections, where the first panel crown engagement section is located between the second and first panel valley engagement sections, and where the second panel crown engagement section is located between the first and third panel valley engagement sections.

With further regard to the case where the mounting bracket of the second embodiment utilizes at least two panel crown engagement sections (the noted first and second panel crown engagement sections) and at least one panel valley engagement section (the noted first panel valley engagement section), the mounting bracket may further include an additional upper wall for each additional panel crown engagement section. The relationships described in the second embodiment between the first panel crown engagement section and the upper wall are equally applicable each additional panel crown engagement section and its corresponding upper wall. As such, the second embodiment of the mounting bracket of the present invention may actually incorporate at least two laterally-spaced upper walls to facilitate securing one or more attachments relative to the mounting bracket.

The following discussion pertains to each of the above-noted first and second embodiments of the present invention, but is not limited to these first and second embodiments. Each panel crown engagement section may include a gasket pocket or receptacle that faces or projects toward the corrugated panel on which the mounting bracket is positioned. An appropriate gasket may be positioned within each of these gasket pockets. Each such gasket pocket may be configured so as to at least substantially confine a gasket positioned therein. In one embodiment, the under-side of each panel crown engagement section includes a pair of rails, projections, or dimples that are spaced from one another and that may extend along at least part of the length of the mounting bracket (e.g., in a dimension coinciding with the spacing between its oppositely disposed ends, noted above). The noted gasket pockets may be defined by the space between each corresponding pair of projections.

Additional functions may be provided by the above-noted projections on the under-side of each panel crown engagement section of the mounting bracket. These projections may contact the corresponding crown of a corrugated panel when the mounting bracket is secured to this corrugated panel. As such and for the above-noted embodiment, there may be two discrete zones of contact between each panel crown engagement section of the mounting bracket and the corresponding crown of the corrugated panel. This reduces the overall contact between each panel crown engagement section and the corresponding panel crown, which should reduce the potential for what is referred to in the art as "capillary entrapment" (e.g., reduces the potential of moisture "wicking" into interfacing surfaces between the mounting bracket and the panel crown, where such moisture may lead to premature failure of the corrugated panel due to corrosion or the like). Another function provided by these projections is that they should reduce the potential of the above-noted gaskets being over-compressed when the mounting bracket is secured to a panel crown using one or more bracket fasteners.

One or more bracket fastener holes may extend through each of the panel crown engagement sections of the mounting bracket. These bracket fastener holes may be unthreaded. Although any appropriate number of bracket fastener holes may be associated with each panel crown engagement section, two bracket fastener holes per panel crown engagement section will be appropriate for at least some applications. These bracket fastener holes may accommodate the use of rivets, sheet metal screws, or the like (e.g., bracket fasteners) to secure the mounting bracket on/relative to a corrugated panel.

There are a number of options for using one or more bracket fasteners to secure the mounting bracket of the present invention on or relative to a corrugated panel. In one installation configuration, each bracket fastener used by the mounting bracket only engages the corrugated panel. That is, each bracket fastener terminates within the hollow interior of a corresponding panel crown of the corrugated panel. As such, the mounting bracket is secured to only the sheeting of the corrugated panel. In another installation configuration where a corrugated panel is supported by an underlying deck or substrate (e.g., having a planar upper surface on which the underside of each panel valley may be disposed), each bracket fastener may extend through a corresponding panel crown and into/through the underlying deck. In another installation configuration where a corrugated panel is supported by underlying purlins, each bracket fastener may extend through a corresponding panel crown and into/through an underlying purlin. In the last two noted installation configurations (where each bracket fastener engages either an underlying deck or purlin), each panel valley engagement section utilized by the mounting bracket should reduce the potential that tightening the bracket fasteners (extending through a panel crown engagement section, through a corresponding panel crown, and into/through and underlying support structure) will crush or collapse the corresponding panel crown of the corrugated panel.

The above-described mounting bracket of the present invention may be part of an attachment assembly. The mounting bracket may be positioned on a corrugated panel. An attachment fastener may be directed at least into a mounting hole on the upper end of the mounting bracket to secure an attachment relative to the mounting bracket. Various types of attachments may be utilized, and either may be directly secured to the mounting bracket by at least one attachment fastener and a corresponding mounting hole in upper wall, or may be indirectly secured to the mounting bracket by at least one attachment fastener and a corresponding mounting hole in upper wall.

In one embodiment, the attachment assembly may be embodied by a photovoltaic system. A mounting assembly of this photovoltaic system includes the above-described mounting bracket, a mounting plate, a clamping member or a pull-down grab member, and a clamp fastener. The mounting plate is positioned on an upper wall(s) of the mounting bracket. The clamping member includes first and second clamping legs, where the first clamping leg is available for engaging one photovoltaic module, and where the second clamping leg is available for engaging an adjacent photovoltaic module. The clamp fastener extends through the clamping member, then through the mounting plate, and then an least into a mounting hole on the upper wall of the mounting bracket to secure at least one photovoltaic module (an attachment) relative to the mounting bracket (indirectly in the noted embodiment). Each of the mounting plate and clamping member could also be viewed as "attachments" that are secured relative to the mounting bracket.

A number of feature refinements and additional features are applicable to the above-described photovoltaic system, and which may utilize one or more mounting brackets of the present invention as described herein. These feature refinements and additional features may be used individually or in any combination. The remainder of this Summary pertains to this photovoltaic system.

The clamp fastener may be threaded into a mounting hole (e.g., the mounting hole may be threaded prior to receipt of the clamp fastener) on the upper wall of the mounting bracket of the present invention. Any appropriate threaded clamp fastener may be utilized to activate a clamping action for the clamping member in relation any photovoltaic module positioned on the mounting plate (e.g., a threaded stud having at least one nut threaded thereon; a bolt). A threaded stud as the threaded clamp fastener may include a nut whose position is fixed on the stud. A single nut may be threaded onto such a threaded stud, or a pair of threaded nuts may be threaded onto the stud so as to be disposed on each side of the clamping member, depending upon the circumstances. A clamp fastener could also extend through a corresponding mounting hole on the upper wall (without any threaded engagement between the clamp fastener and the upper wall), and a nut could be threaded onto an end of the clamp fastener that extends beyond the upper wall (within the hollow interior of the mounting bracket). For instance, the portion of the clamp fastener that extends through the mounting hole could be un-threaded in this case, the mounting hole could be un-threaded in this case, or both.

The mounting plate may be a structure having first and second oppositely disposed and planar surfaces. However, various features may be incorporated by the mounting plate to facilitate one or more aspects of the installation of a photovoltaic system. For instance, the mounting plate may incorporate one or more features to facilitate the alignment/ positioning of one or more photovoltaic modules relative to the mounting assembly for/during installation. The mounting plate may incorporate one or more features to facilitate the grounding of a photovoltaic module that is engaged/ secured by the corresponding mounting assembly. The mounting plate may incorporate one or more wire management features. Each of these three overall/general features may be individually incorporated by the mounting plate. Any and all combinations of these three overall/general features may be incorporated by the mounting plate as well.

The mounting plate may be of any appropriate size, shape, and/or configuration (e.g., a circular outer perimeter; a square outer perimeter; a rectangular outer perimeter), may be formed from any appropriate material or combination of materials (e.g., a metal or metal alloy), or both. The mounting plate may include an upper surface and an oppositely disposed lower surface, with the lower surface being in contact with the mounting bracket (e.g., its upper wall) when the mounting assembly is installed on a building surface.

The upper surface of the mounting plate may include first and second PV module positional registrants. These first and second PV module positional registrants may be utilized to dispose first and second PV modules on the upper surface of the mounting plate in a position for proper engagement by the clamping member. In one embodiment, the first PV module is positioned in at least adjacent relation to the first PV module positional registrant and the second PV module is positioned in at least adjacent relation to the second PV module positional registrant. In one embodiment, the first PV module actually butts up against the first PV module positional registrant (e.g., the first PV module positional registrant disposes the first PV module in a certain position on the mounting plate), while the second PV module actually butts up against the second PV module positional registrant (e.g., the second PV module positional registrant disposes the second PV module in a certain position on the mounting plate).

Each of the above-noted first and second PV module positional registrants may be of any appropriate size, shape, configuration, and/or type, and furthermore may be disposed in any appropriate arrangement on the upper surface of the mounting plate. In one embodiment the upper surface of the mounting plate includes what may be characterized as a raised structure (e.g., of a continuous or unitary nature). First and second portions on a perimeter of this raised structure may be characterized as the noted first and second PV module positional registrants.

The clamp fastener may extend through a center of the raised structure on the upper surface of the mounting plate. An outer perimeter of the raised structure may be circular in a plan view. The raised structure may be centrally disposed relative to an outer perimeter of the mounting plate. An outer perimeter of the raised structure and an outer perimeter of the mounting plate may be concentric or concentrically disposed relative to the clamp fastener. The raised structure may be characterized as annular, doughnut-shaped, ring or ring-like, or any combination thereof. In any case, the raised structure may be integrally formed with a remainder of the mounting plate, such that the need to separately attach the raised structure to the mounting plate may be alleviated (e.g., the mounting plate and the raised structure may be a one-piece structure).

The raised structure may be a configuration that alleviates the need to position the mounting plate on the mounting bracket in any particular orientation. Consider the case where a first reference line extends from the clamp fastener and remains in a fixed position relative to the mounting plate, where a second reference line extends from the clamp fastener and moves along with the mounting plate as the mounting plate is rotated relative to the mounting bracket about the clamp fastener, and where the first and second reference lines are contained within a common plane. The raised structure may be of a configuration that allows for any angle between the first and second reference lines (including the case where there is no angle at all or a "zero angle"), and yet still allows the raised structure to be used to positionally register each of first and second photovoltaic modules relative to the mounting plate (e.g., by the first and second PV modules engaging oppositely disposed portions on the perimeter of the raised structure).

The first and second PV module positional registrants may be separate and discrete structures (i.e., not different portions of a common structure, such as the above-noted raised structure). The first and second PV module positional registrants in this case may be disposed along a common reference line that passes through the clamp fastener. Although the first and second PV module positional registrants may be disposed at different distances from the clamp fastener, in one embodiment the first and second PV module positional registrants are disposed the same distance from the clamp fastener.

An installer could visually determine the proper orientation for the mounting plate on the mounting bracket when the first and second PV module positional registrants are separate and discrete structures. However, it may be desirable to include at least one mounting bracket positional registrant on a lower surface of the mounting plate for purposes of establishing a desired positioning of the mounting plate on the mounting bracket (e.g., such that the clamping member should sufficiently engage each of a pair of adjacently disposed photovoltaic modules). Each such mounting bracket positional registrant may be of any appropriate size, shape, configuration, and/or type (e.g., tabs, pins, posts, or the like). In one embodiment, a pair of mounting bracket positional registrants is utilized to engage oppositely disposed portions of the mounting bracket (e.g., a pair of oppositely disposed ends of the mounting bracket) to dispose the mounting plate in a desired position relative to the mounting bracket.

The upper surface of the mounting plate may include what may be characterized as a plurality of "grounding projections." Each such grounding projection may be of any appropriate size, shape, configuration, and/or type. The grounding projections may be integrally formed with a remainder of the mounting plate, such that the need to separately attach each grounding projection to the mounting plate is alleviated (e.g., the mounting plate and the plurality of grounding projections may be a one-piece structure).

The various grounding projections may be of a configuration that facilitates establishing an electrical connection with and/or providing a grounding function for a photovoltaic module (e.g., by engaging a frame of such a photovoltaic module, and which may require that the grounding projection(s) pierce or penetrate a surface or surface coating of this frame). For instance, each grounding projection could incorporate one or more edges to desirably interface with a corresponding photovoltaic module. One or more of the grounding projections could be in the form of a tooth or a tooth-like structure. One or more of the grounding projections could be in the form of a hollow cylinder that incorporates at least one edge on a free end thereof.

The grounding projections may be characterized as providing electrical continuity between adjacent photovoltaic modules that are positioned on a common mounting plate (e.g., an electrical path may encompass the frame of one photovoltaic module, one or more grounding projections engaged therewith, an associated mounting plate, one or more additional grounding projections, and the frame of another photovoltaic module engaged by such an additional grounding projection(s)). This may be referred to in the art as "bonding." In any case, the grounding projections may be used in providing a grounding function for a corresponding photovoltaic module(s). The noted electrical connection provided by the grounding projections may be used to electrically connect adjacent photovoltaic modules (e.g., those positioned on a common mounting plate), and which may be used to provide an electrical path to ground a string or collection of photovoltaic modules.

The plurality of grounding projections may be characterized as being spaced about the clamp fastener. The plurality of grounding projections may be equally spaced about the clamp fastener (e.g., located every 90° in the case where there are four grounding projections). In one embodiment, each grounding projection on the upper surface of the mounting plate is located further from the clamp fastener than each of the first and second PV module positional registrants.

Any appropriate number of grounding projections may be utilized on the upper surface of the mounting plate, and multiple grounding projections may be disposed in any appropriate arrangement. One embodiment has at least one grounding projection engaged with each photovoltaic module (e.g., its frame) that is placed on the mounting plate. It should be appreciated that a first grounding projection or a first set of grounding projections could engage a first photovoltaic module placed on the mounting plate, and that a second grounding projection or a second set of grounding projections could engage a second photovoltaic module placed on the mounting plate, where the first and second grounding projections are different ones of the plurality of grounding projections, and where the first and second sets of grounding projections do not any common grounding projections.

The number and/or arrangement of the plurality of grounding projections may be selected so as to alleviate the need to position the mounting plate on the mounting bracket in any particular orientation, and yet still allow one or more of the grounding projections to be in contact with each photovoltaic module positioned on the mounting plate. Consider the case where a first reference line extends from the clamp fastener and remains in a fixed position relative to the mounting plate, where a second reference line extends from the clamp fastener and moves along with the mounting plate as the mounting plate is rotated relative to the mounting device about the clamp fastener, and where the first and second reference lines are contained within a common plane. The number and/or arrangement of the plurality of grounding projections may be selected such that any angle may exist between the first and second reference lines (including the case where there is no angle at all or a "zero angle"), and yet still allow one or more grounding projections to be in contact with each photovoltaic module positioned on the mounting plate.

The lower surface of the mounting plate may include at least one wiring clip, including where this lower surface includes a plurality of wiring clips. Any appropriate number of wiring clips may be utilized. Multiple wiring clips may be spaced about the clamp fastener, and including in equally-spaced relation (e.g., every 90° in the case where there are four of such wiring clips). In one embodiment, each wiring clip on the lower surface of the mounting plate is located further from the clamp fastener than each of the first and second PV module positional registrants.

The wiring clips may be of any appropriate configuration that allows one or more wires to be retained in the space between the wiring clip and the lower surface of the mounting plate. A portion of each wiring clip may be disposed in at least generally parallel and spaced relation to the lower surface of the mounting plate, and this portion may include a recessed region to facilitate the retention of one or more wires, quick-connect leads, or the like therein.

Multiple wiring clips may be disposed in any appropriate arrangement on the lower surface of the mounting plate. Although each mounting clip could be separately attached to the mounting plate, in one embodiment each mounting clip is integrally formed with the remainder of the mounting plate (e.g., such that the mounting plate and each of its mounting clips is a one-piece structure). Consider the case where the mounting clips are "stamped" from the body of the mounting plate. The resulting aperture in the mounting plate may also be utilized in the installation of photovoltaic modules. For instance, an installer may direct a cable or zip tie through such an aperture to bundle a plurality of wires or the like together that are located underneath the mounting assembly or in the space between an adjacent pair of PV modules.

DETAILED DESCRIPTION

Figure 1:
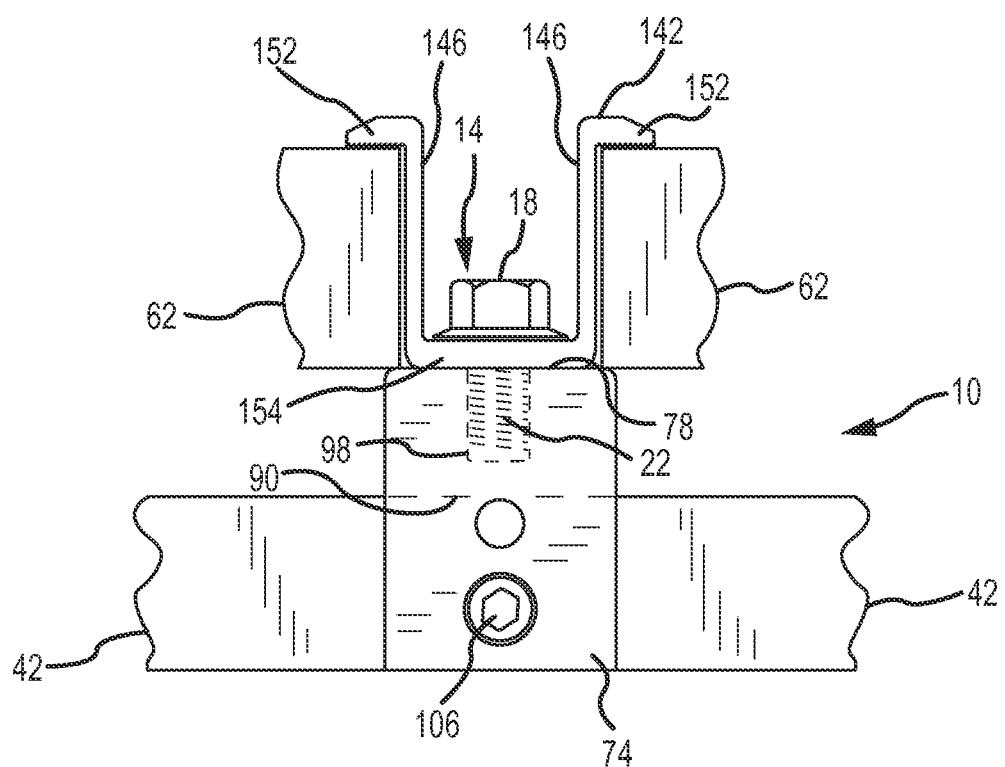
FIG. 1 is a side view of a prior art mounting assembly for interconnecting solar cell modules with a standing seam roof.
Figure 2:
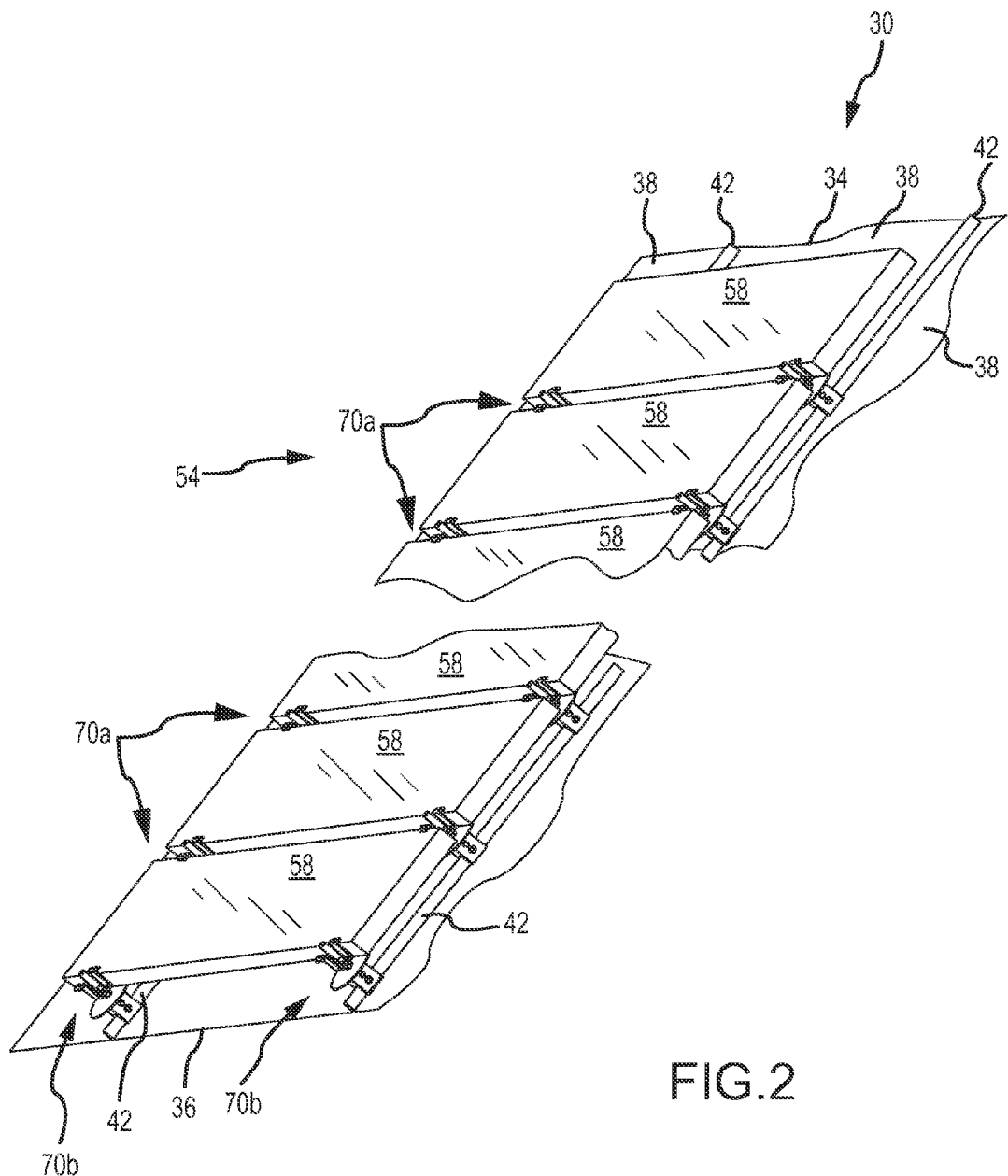
FIG. 2 is a perspective view of a plurality of solar cell modules installed on a standing seam building surface using a plurality of adjustable mounting assemblies.

FIG. 2 illustrates an assembly 30 in the form of a building surface 34, a photovoltaic or solar cell array 54 defined by a plurality of photovoltaic modules or solar cell modules 58 (only schematically shown in FIG. 2), and a plurality of mounting assemblies 70a, 70b. The building surface 34 is defined by interconnecting a plurality of panels 38. Although the panels 38 may be formed from any appropriate material or combination of materials, typically they are in the form of metal panels 38. In any case, each adjacent pair of panels 38 is interconnected in a manner so as to define a standing seam 42 (only schematically shown in FIG. 2). A base 46 is disposed between the opposing edges of each panel 38 (e.g., FIG. 3). The entirety of the base 46 may be flat or planar. However, one or more small structures may be formed/shaped into the base 46 of one or more panels 38 of the building surface 34 to address oil canning. These structures are commonly referred to as crests, minor ribs, intermediate ribs, pencil ribs, striations, fluting, or flutes.

Figure 3:
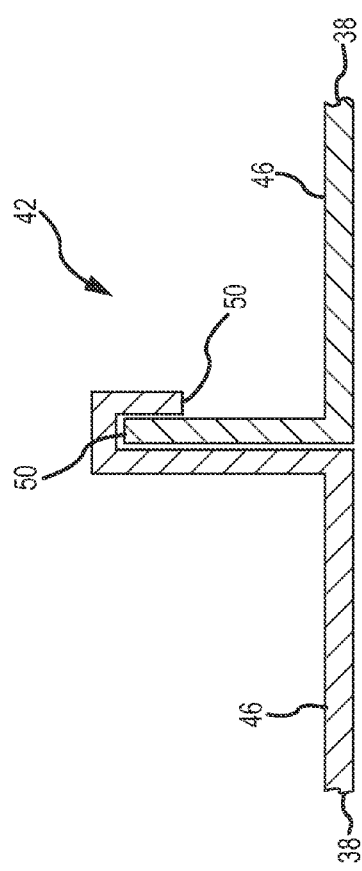
FIG. 3 is a cross-sectional schematic of a representative standing seam defined by interconnecting a pair of panels.

A cross-sectional schematic of one of the standing seams 42 is illustrated in FIG. 3. There it can be seen that a pair of interconnected panels 38 define a standing seam 42. Generally, an edge or edge section 50 of one panel 38 is "nested" with the opposing edge or edge section 50 of the adjacent panel 38 to define a standing seam 42. Typically each the two opposing edges 50 of a given panel 38 will be of a different configuration. That way, one edge 50 (one configuration) of one panel 38 will be able to "nest" with one edge 50 (another configuration) of the adjacent panel 38. Various configurations may be employed for the edges 50 of the panels 38, and which may provide different configurations/profiles for the corresponding standing seam 42.

Figure 4:
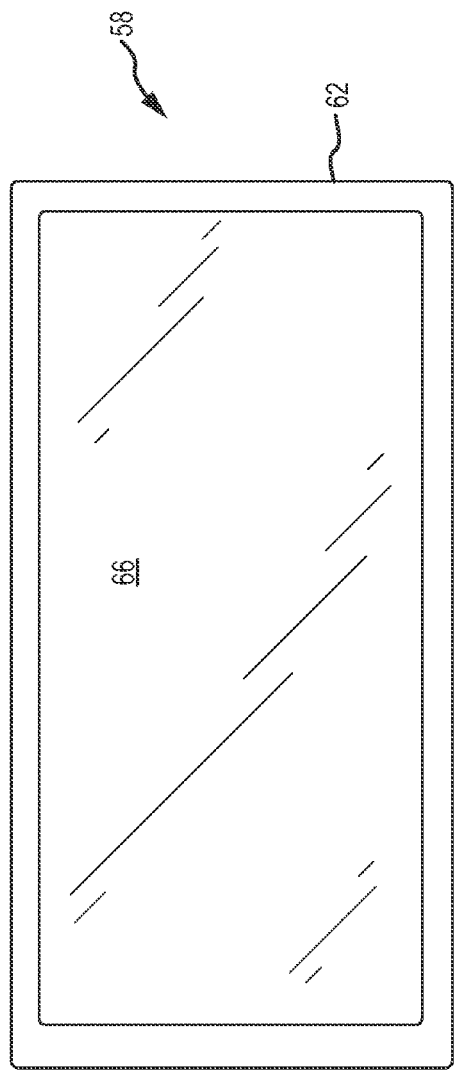
FIG. 4 is a top view of one of the solar cell modules illustrated in FIG. 2.

A more detailed view of one of the photovoltaic modules or solar cell modules 58 from FIG. 2 is presented in FIG. 4. Each solar cell module 58 includes a frame 62 that is disposed about the corresponding solar cell 66. The frame 62 may be of any appropriate size, shape, configuration, and/or type, and may be formed from any appropriate material or combination of materials. In the illustrated embodiment, the frame 62 is of a rectangular profile, and may be formed from an appropriate metal or metal alloy (e.g., aluminum). Similarly, the photovoltaic cell or solar cell 66 may be of any appropriate size, shape, configuration and/or type to convert light into electricity. Typically the solar cell 66 will be in the form of a substrate having a stack of a plurality of layers. Any number of solar cell modules 58 may be used for the solar cell array 54 of FIG. 2, and multiple solar cell modules 58 may be disposed in any appropriate arrangement.

Figure 5:
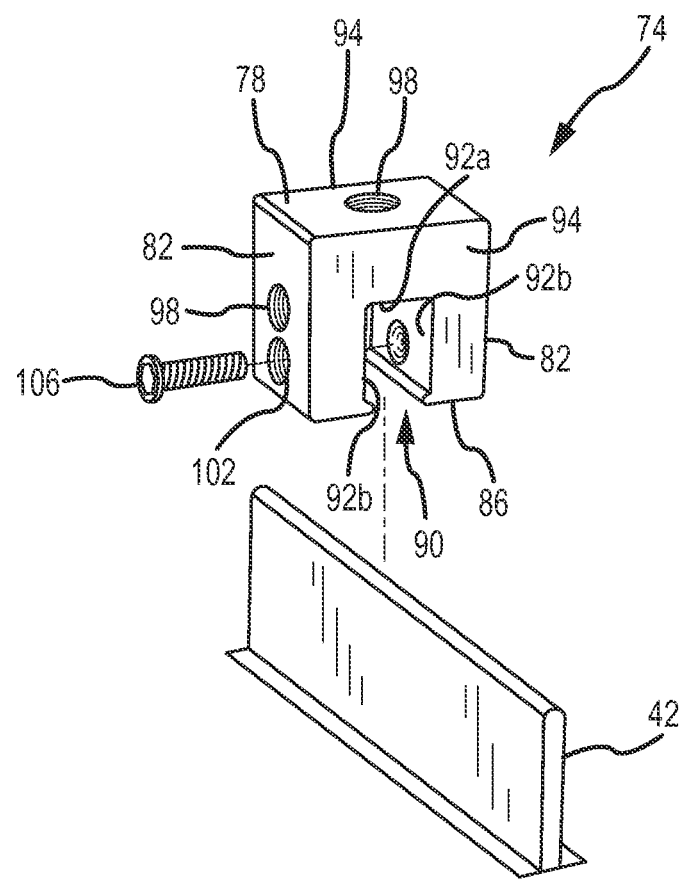
FIG. 5 is a perspective view of one of the mounting devices that is installed on a standing steam in FIG. 2.

The mounting assemblies 70a, 70b that are used to install the solar cell array 54 onto the building surface 34 in FIG. 2 utilize a mounting device 74 that may be of any appropriate size, shape, configuration, and/or type. One configuration of a mounting device that may be installed on a standing seam 42 is illustrated in FIG. 5 and is identified by reference numeral 74. This mounting device 74 includes an upper surface 78 and an oppositely disposed bottom surface 86, a pair of oppositely disposed side surfaces 82, and a pair of oppositely disposed ends 94. The upper surface 78 includes a threaded hole 98, as does at least one of the side surfaces 82, while the bottom surface 86 includes a slot 90 that extends between the two ends 94 of the mounting device 74.

The slot 90 on the bottom surface 86 of the mounting device 74 includes a base 92a and a pair of sidewalls 92b that are spaced apart to receive at least an end section of a standing seam 42. One or more seam fasteners 106 may be directed through a threaded hole 102 of the mounting device 74 and into the slot 90 to engage the standing seam 42 and secure the same against the opposing slot sidewall 92b. A cavity of any appropriate type may be on this opposing slot sidewall 92b to allow the aligned seam fastener 106 to deflect a corresponding portion of the standing seam 42 into this cavity, although such may not be required in all instances. In any case and in one embodiment, the seam fastener 106 only interfaces with an exterior surface of the standing seam 42. For instance, the end of the seam fastener 106 that interfaces with the standing seam 42 may be convex, rounded, or of a blunt-nosed configuration to provide a desirable interface with the standing seam 42.

Other mounting device configurations may be appropriate for mounting on standing seam 42 and that may be used in place of the mounting device 74 shown in FIG. 5. Various mounting device configurations are disclosed in U.S. Pat. Nos. 5,228,248; 5,483,772; 5,941,931; 5,694,721; 5,715,640; 5,983,588; 6,164,033; 6,718,718; 7,100,338; and 7,013,612, and which may be utilized by either of the mounting assemblies 70a, 70b.

Figure 6:
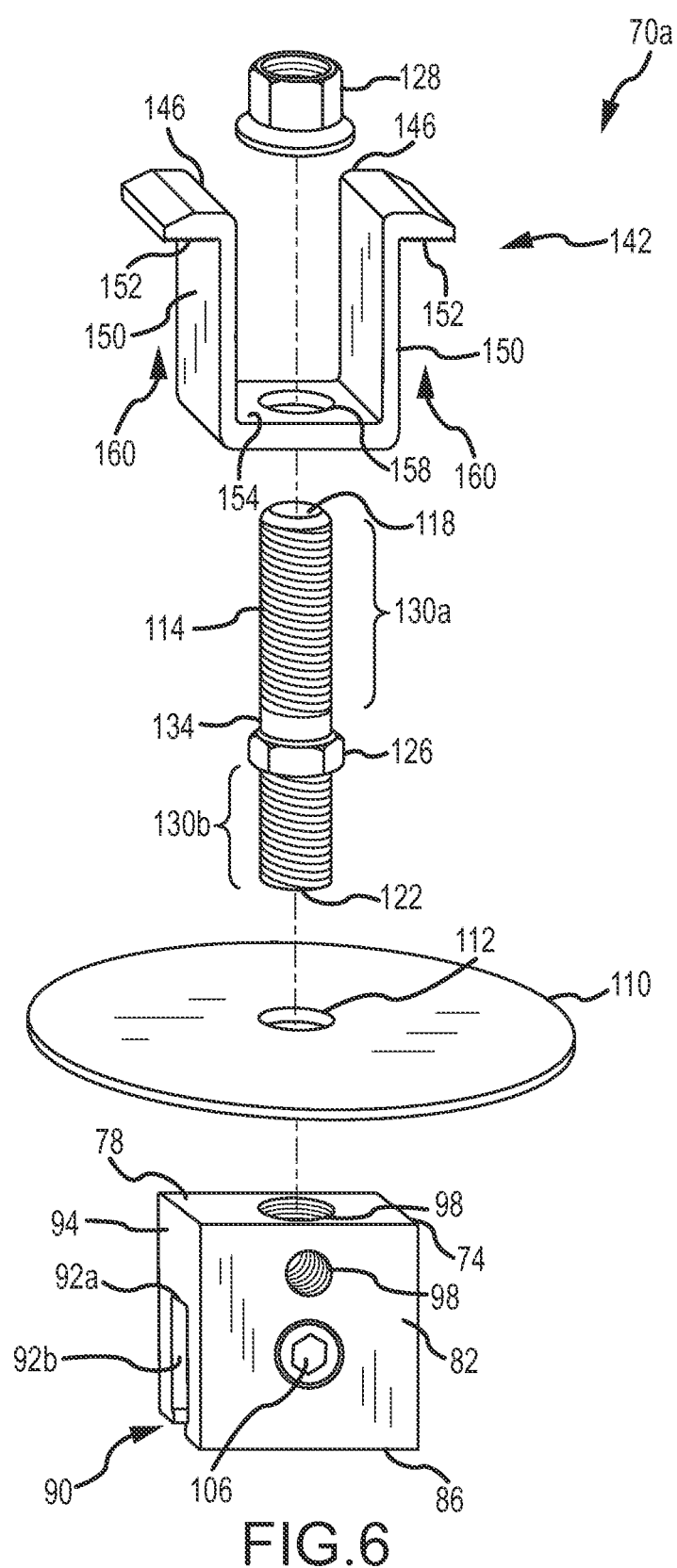
FIG. 6 is an exploded, perspective view of one of the adjustable mounting assemblies from FIG. 2.

The mounting assembly 70a that is used in the installation of a pair of adjacent solar cell modules 58 in FIG. 2, and that may use a mounting device 74, is illustrated in FIG. 6. The mounting assembly 70a includes a mounting device 74, along with a mounting plate 110, a clamping member 142, a stud 114, and a nut 128. The mounting plate 110 is disposed on the upper surface 78 of the mounting device 74, and includes a hole or aperture 112 that allows the stud 114 to pass therethrough. The mounting plate 110 may be utilized when it may be desirable to enhance the stability of the mounting assembly 70a, and in any case may be of any appropriate size, shape, configuration and/or type. The surface area of the mounting plate 110 is at least about 5 in$^2$ in one embodiment, and is at least about 7 in$^2$ in another embodiment. It may be possible to eliminate the mounting plate 110 from the mounting assembly 70a, for instance when the surface area of the upper surface 78 of the mounting device 74 is sufficiently large.

The stud 114 provides an interface between the clamping member 142 and the mounting device 74, and includes a first stud end 118 and an oppositely disposed second stud end 122. A nut 126 is disposed between the first stud end 118 and the second stud end 122, and is fixed to the stud 114 in any appropriate manner (e.g., welded). That is, the nut 126 does not move relative to the stud 114, such that the nut 126 and stud 114 will move together as a single unit. In one embodiment, the nut 126 is threaded onto the stud 114, and is then fixed in the desired location.

A first threaded section 130a extends from the first stud end 118 toward the second stud end 122, while a second threaded section 130b extends from the second stud end 122 toward the first stud end 118. An unthreaded section 134 is disposed between the fixed nut 126 and the first threaded section 130a in the illustrated embodiment. However, the first threaded section 130a could extend all the way to the fixed nut 126 (e.g., the entire stud 114 could be threaded). In one embodiment, the length of the first threaded section is at least about 1.5 inches.

The second stud end 122 may be directed through the hole 112 in the mounting plate 110 if being utilized, and in any case into a threaded hole 98 of the mounting device 74. It should be appreciated that the mounting device 74 could also be disposed in a horizontal orientation on a standing seam having a horizontally disposed end section versus the vertically disposed orientation of the end section of the standing seam 42, and that in this case the second stud end 122 would be directed into the threaded hole 98 on a side surface 82 of the mounting device 74 (e.g., the mounting plate 110 could then be disposed on such a side surface 82 if desired/required). In any case, the stud 114 may be tightened onto the mounting device 74 by having an appropriate tool engage the fixed nut 126 to rotate the stud 114 relative to the mounting device 74 and into a desired forcible engagement with the mounting plate 110 or with the corresponding surface of the mounting device 74 if the mounting plate 110 is not being used. In one embodiment, the fixed nut 126 is located along the length of the stud 114 such that the second stud end 122 does not extend into the slot 90 of the mounting device 74 when the stud 114 is tightened onto the mounting device 74. Having this stud end 122 extend into the slot 90 could potentially damage the standing seam 42.

The clamping member 142 includes a base 154 that is disposed on the fixed nut 26 of the stud 114. A hole 158 extends through the base 154 and is aligned with a threaded hole 98 of the mounting device 74. In the illustrated embodiment, the hole 156 in the clamping member 142 is not threaded such that the clamping member 142 may "slide" along the stud 114.

A pair of clamping legs 146 that are disposed in opposing relation extend upwardly from the base 154 in a direction that is at least generally away from the mounting device 74 when the mounting assembly 70a is installed, such that the base 154 and clamping legs 146 define an at least generally U-shaped structure. Each clamping leg 146 includes an extension 150 and an engagement section 152. The engagement sections 152 are disposed in a different orientation than the extensions 150, and function to provide a surface to engage and clamp a structure to the mounting assembly 70a. In the illustrated embodiment, the engagement sections 150 include teeth, serrations, or like to enhance the "grip" on the structure being clamped to the mounting assembly 70a. The clamping legs 146 may be of any appropriate size, shape, and/or configuration for clamping a structure to the mounting assembly 70a. Generally, a pocket 160 is defined between each engagement section 152 and the underlying mounting plate 110/mounting device 74 for receiving a structure to be clamped to the mounting assembly 70a.

Figure 7A:
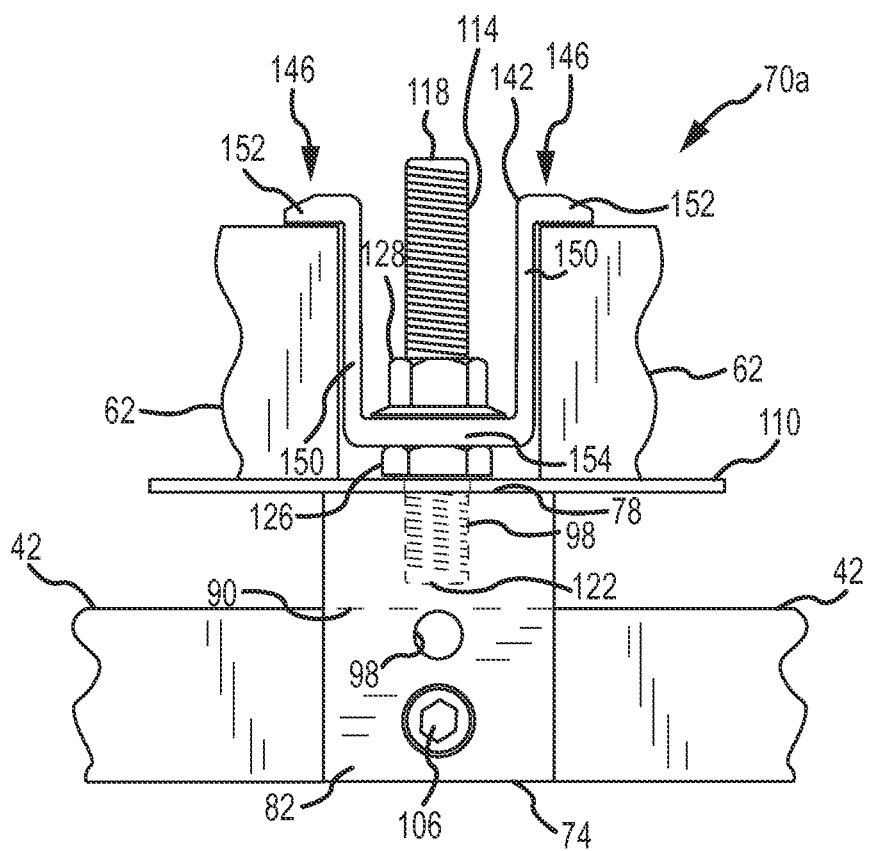
FIG. 7A is a side view of one of the adjustable mounting assemblies from FIG. 2, and which is engaging a pair of solar cell module frames.

FIG. 7A illustrates one of the mounting assemblies 70a from FIG. 2, and which again interfaces with a pair of solar cell modules 58. Installation of such a mounting assembly 70a could entail directing at least the upper portion of the standing seam 42 into the slot 90 of the mounting device 74. Thereafter, the mounting device 74 may be secured to the standing seam 42 using at least one seam fastener 106. Once again, the seam fastener 106 may be directed through the mounting device 74 and into the slot 90 to force a corresponding portion of the standing seam 42 against the opposing slot sidewall 92b.

The mounting plate 110 may be disposed on the upper surface 78 of the mounting device 74 such that its hole 112 is aligned with a threaded hole 98 on the mounting device 74 that will receive the stud 114. The second stud end 122 may then be directed through the hole 112 of the mounting plate 110 such that the stud 114 may be threaded to the mounting device 74 (e.g., using a wrench on the fixed nut 126 to clamp the mounting plate 110 between the fixed nut 126 and the mounting device 74). At this time, the lower surface of the fixed nut 126 engages the upper surface of the mounting plate 110 or a corresponding surface of the mounting device 74 if the mounting plate 110 is not used. As previously noted, and as illustrated in FIG. 7A, in one embodiment the second stud end 122 does not pass into the slot 90 of the mounting device 74. It should be appreciated that the mounting plate 110 and stud 114 could be installed on the mounting device 74 prior to its installation on the standing seam 42.

A frame 62 from one of the solar cell modules 58 may be positioned on one side of the mounting plate 110, while a frame 62 from another of the solar cell modules 58 may be positioned on the opposite side of the mounting plate 110. The clamping member 142 may or may not be positioned on the stud 114 at the time the solar cell module frames 62 are positioned on the mounting plate 110. In any case, the first stud end 118 may be directed through the hole 158 on the base 154 of the clamping member 142. At this time a portion of one solar cell module frame 62 will then be positioned between the mounting plate 110 and the engagement section 152 of one of the clamping legs 146, while a portion of another solar cell module frame 62 will then be positioned between the mounting plate 110 and the engagement section 152 of the other clamping leg 146. The nut 128 may then be threaded onto the first stud end 118 of the stud 114 until the engagement sections 152 of the clamping member 142 exert a desired force on the two solar cell module frames 62 (e.g., to clamp these frames 62 between the engagement sections 152 of the clamping member 142 and the mounting plate 110, or between the engagement sections 152 of the clamping member 142 and the mounting device 74 if the mounting plate 110 is not being used). That is, turning the nut 128 may move the clamping member 142 along the stud 114 and toward the mounting device 74 (e.g., by the clamping member 142 "sliding" along the stud 114) to generate the desired clamping action. It should be appreciated that the clamping member 142 and possibly the nut 128 could be positioned on the stud 114 at the time when the solar cell module frames 62 are disposed on the mounting plate 110, although this may require that the clamping member 142 be lifted to a degree at this time to accommodate positioning the frames 62 under the engagement sections 152 of the clamping member 142.

Figure 7B:
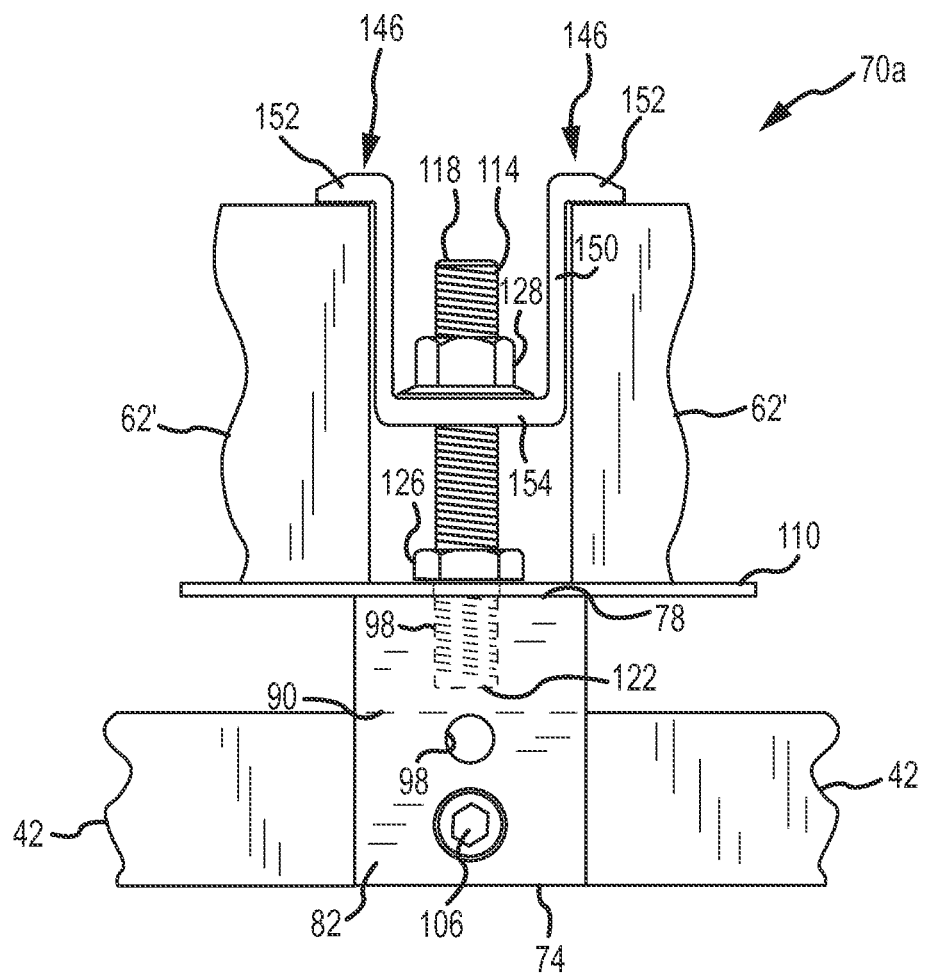
FIG. 7B shows the mounting assembly of FIG. 7A being used for solar cell module frames having a different thickness than those illustrated in FIG. 7A.

As evident by a review of FIG. 7A, the stud 114 may extend beyond the nut 128 in the installed configuration. Preferably the first threaded section 130a of the stud 114 is of a length that allows the mounting assembly 70a to be used to clamp structures of various thicknesses to the mounting assembly 70a. For instance, FIG. 7B illustrates a pair of solar cell module frames 62' being clamped to the mounting assembly 70a, where these frames 62' are thicker than the frames 62 presented in FIG. 7A. In one embodiment, the length of the first threaded section 130a is at least about 1.5 inches, and which accommodates using the mounting assembly 70a to clamp solar cell modules of a number of different thicknesses (e.g., the fixed nut 126 may be spaced from the first stud end 118 by a distance of at least about 1.5 inches, the first threaded section 130a may extend all the way to the fixed nut 126, or both).

Figure 7C:
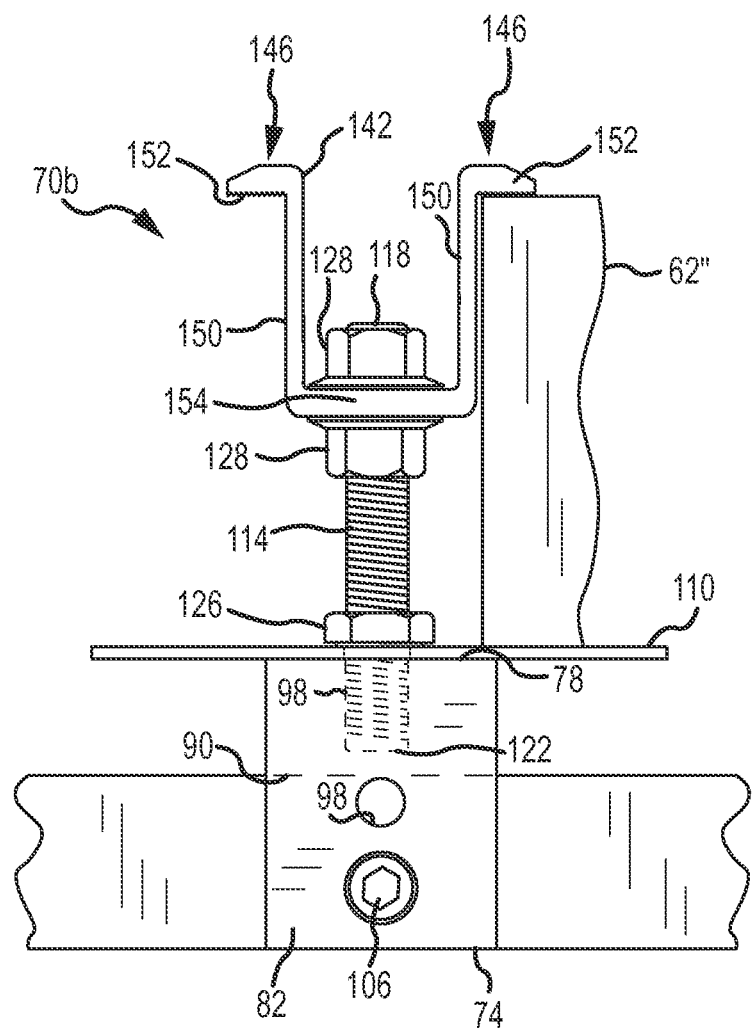
FIG. 7C is a side view of one of the adjustable mounting assemblies from FIG. 2 that is disposed adjacent to an edge of the building surface, and which is engaging a single solar cell module frame.

The above-described mounting assemblies 70a may be used to simultaneously engage the frame 62 of a pair of solar cell modules 58. In at least some cases, there may only be a need to engage a single solar cell 58, such as in the case of those solar cells 58 that are disposed closest to an edge 36 of the building surface 34 (FIG. 2). FIG. 7C illustrates a configuration for this situation, and which is identified by reference numeral 70b. Corresponding parts of the mounting assemblies 70a and 70b are identified by the same reference numeral. The only difference between the mounting assembly 70b and the mounting assembly 70a is that an additional nut 128 is used by the mounting assembly 70b. Therefore, the remainder of the discussion presented above also applies to the mounting assembly 70b.

Generally, one nut 128 is threaded onto the first stud end 118, followed by positioning a clamping member 142 over the first stud end 118 and onto the stud 114, then followed by a second nut 128 that is threaded onto the first stud end 118. The lower nut 128 may be threaded down a sufficient distance on the stud 114. Thereafter, the top nut 128 may be threaded to clamp a solar cell module frame 62" between the mounting plate 110 and the engagement section 152 of one of the clamping members 142. The lower nut 128 may then be threaded upwardly on the stud 118 to engage the underside of the base 154 of the clamping member 142.

Another embodiment of a mounting assembly, which may be used for mounting photovoltaic or solar cell modules to a building surface having a plurality of standing seams defined by a plurality of interconnected panels, is illustrated in FIGS. 8A-F and is identified by reference numeral 70c. Corresponding components between the mounting assembly 70c and the above-discussed mounting assembly 70a are identified by the same reference numerals. Those corresponding components between these two embodiments that differ in at least some respect are identified by the same reference numeral, but with a "single prime" designation in relation to the mounting assembly 70c.

The mounting assembly 70c of FIGS. 8A-F utilizes the above-discussed mounting device 74, clamping member 142, and stud 114. All of the features discussed above in relation to each of these components remain equally applicable to the mounting assembly 70c. The mounting assembly 70c does utilize a mounting plate 110' that is positioned on an upper surface 78 of the mounting device 74, and that is located between the clamping member 142 and the mounting device 74 in a dimension corresponding with the length dimension of the stud 114. However, the mounting place 110' is of a different configuration than the mounting plate 110 utilized by the mounting assembly 70a, and therefore the noted "single prime" designation is utilized.

The mounting plate 110' includes an upper surface 170 and an oppositely disposed lower surface 176. The upper surface 170 includes a plurality of grounding projections 172. The grounding projections 172 may be integrally formed with a remainder of the mounting plate 110' (e.g., the mounting plate 110' and grounding projections 172 may be of one-piece construction, such that the individual grounding projections 172 do not need to be separately attached to the mounting plate 110'). Any appropriate number of grounding projections 172 may be utilized. Each grounding projection 172 may be of any appropriate size, shape, and/or configuration. The various grounding projections 172 may be equally spaced from the stud 114, may be equally spaced about the stud 114, or both.

In one embodiment, the number of grounding projections 172 is selected and the grounding projections 172 are arranged such that at least one grounding projection 172 will engage each photovoltaic module being mounted to a building surface by the clamp assembly 70c, regardless of the angular position of the mounting plate 110' relative to the stud 114. "Angular position" does not mean that the mounting plate 110' is disposed at an angle relative to the upper surface 78 of the mounting device 74. Instead, "angular position" means a position of the mounting plate 110' that may be realized by rotating the mounting plate 110' relative to the stud 114 and/or the mounting device 74. Consider the case where the ends 94 of the mounting device 74 define the 12 o'clock and 6 o'clock positions. The mounting plate 110' may be positioned on the mounting device 74 with each of its grounding projections 172 being disposed at any angle relative to the 12 o'clock position (e.g., in the 1 o'clock position, in the 2 o'clock position, in the 8 o'clock position, etc), and yet at least one grounding projection 172 will engage each photovoltaic module being mounted to a building surface by the clamp assembly 70c. The "angle" of each such grounding projection 172 is the angle between first and second reference lines that are disposed within a common plane, the first reference line remaining in a fixed position relative to the mounting plate 110' and extending from the stud 114, for instance, to the noted 12 o'clock position. The second reference line may also extend from the stud 114 to a particular grounding projection 172, and thereby may rotate along with the mounting plate 110' as its angular position is adjusted relative to the stud 114 and/or mounting device 74.

The grounding projections 172 may facilitate establishing an electrical connection with and/or assisting in grounding one or more photovoltaic modules. The grounding projections 172 may be characterized as providing electrical continuity between adjacent photovoltaic modules that are positioned on the same mounting plate 110' (e.g., an electrical path may encompass the frame of one photovoltaic module, one or more grounding projections 172 engaged therewith, the mounting plate 110', one or more additional grounding projections 172, and the frame of another photovoltaic module engaged by such an additional grounding projection(s) 172). This may be referred to in the art as "bonding." In any case, the grounding projections 172 may be used in providing a grounding function for a corresponding photovoltaic module(s). The noted electrical connection provided by the grounding projections 172 may be used to electrically connect adjacent photovoltaic modules (e.g., those positioned on a common mounting plate 110'), and which may be used to provide an electrical path to ground a string or collection of photovoltaic modules.

The mounting device 110' also includes a raised structure 174 on its upper surface 170. The raised structure 174 may be disposed about the un-threaded hole 112 in the mounting plate 110' and through which the stud 114 passes. Generally and as will be discussed in more detail below, the raised structure 174 may be used to determine where a photovoltaic module should be positioned on the upper surface 170 of the mounting plate 110' to ensure that the clamping member 142 will adequately engage not only this photovoltaic module, but an adjacently disposed photovoltaic module as well. As such, the raised structure 174 may be characterized as a positional registrant or alignment feature for each an adjacent pair of photovoltaic modules being clamped by a common mounting assembly 70c.

The raised structure 174 may be integrally formed with a remainder of the mounting plate 110' (e.g., the mounting plate 110' and raised structure 174 may be of one-piece construction, such that the raised structure 174 does not need to be separately attached to the mounting plate 110'). The raised structure 174 may be characterized as being doughnut-shaped. The raised structure 174 may extend completely about the stud 114, the stud 114 may extend through a center of the raised structure 174, or both. The raised structure 174 may be circular in a plan view. This alleviates the requirement to have the mounting plate 110' be in a certain angular position on the upper surface 78 of the mounting device 74 to provide its positional registration or alignment function in relation to the photovoltaic modules to be clamped. An outer perimeter of the raised structure 174 and an outer perimeter of the mounting plate 110' may be concentrically disposed relative to the stud 114. The raised structure 174 may be centrally disposed relative to an outer perimeter of the mounting plate 110'.

The lower surface 176 of the mounting plate 110' includes a plurality of wiring tabs or clips 178. The wiring clips 178 may be integrally formed with a remainder of the mounting plate 110' (e.g., the mounting plate 110' and wiring clips 178 may be of one-piece construction, such that the individual wiring clips 178 do not need to be separately attached to the mounting plate 110'). For instance, the wiring clips 178 could be "stamped" from the body of the mounting plate 110'. In this regard, the mounting plate 110' includes an aperture 184 for each such wiring clip 178. Any appropriate number of wiring clips 178 may be utilized. The various wiring clips 178 may be equally spaced from the stud 114, may be equally spaced about the stud 114, or both.

In one embodiment, the number of wiring clips 178 is selected and the wiring clips 178 are arranged such that at least one wiring clip 178 should be available for holding/retaining one or more wires from/for each photovoltaic module being mounted to a building surface by the clamp assembly 70c, regardless of the angular position of the mounting plate 110' relative to the stud 114 and/or mounting device 74.

Each wiring clip 178 may be of any appropriate size, shape, and/or configuration. In the illustrated embodiment, each wiring clip 178 includes a first segment 180a that extends away from the lower surface 176 of the mounting plate 110', along with a second segment 180b that extends from a distal end of the first segment 180a. The second segment 180b may be disposed at least generally parallel with the lower surface 176 of the mounting plate 110'. In any case, the second segment 180b may include a recessed region 182 (e.g., a concave area) to facilitate retention of one or more wires and/or quick-connect leads.

A wiring clip 178 may be used the support and/or retain the quick-connect lead(s) associated with one of the photovoltaic modules being clamped by the corresponding mounting assembly 70c (e.g., by being positioned within the space between the second segment 180*b* of a given wiring clip 178 and the lower surface 176 of the mounting plate 110', for instance by resting in a concave portion of the second segment 180*b* in the form of the noted recessed region 182). Other wires could be directed into the space between the second segment 180*b* of a given wiring clip 178 and the lower surface 176 of the mounting plate 110'.

Another function is indirectly provided by the wiring clips 178. The aperture 184 associated with each wiring clip 178 provides a space through which an installer may direct cable or zip tie or the like to bundle together various wires that may be located at a lower elevation than the mounting plate 110' (e.g., wires underneath the mounting assembly 70*c*; wires underneath a photovoltaic module being clamped by the mounting assembly 70*c*; wires in a space between a pair of photovoltaic modules being clamped by the mounting assembly 70*c*).

Figure 8A:
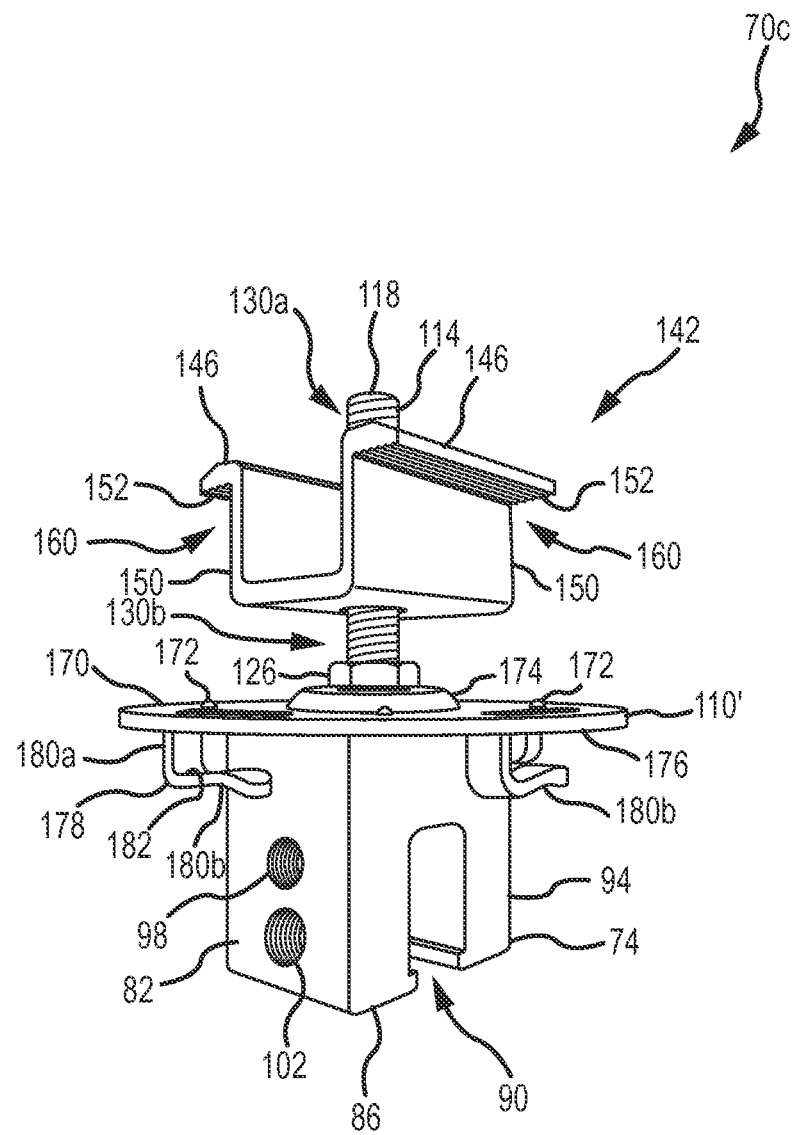
FIG. 8A is one side-based perspective view of another embodiment of a mounting assembly for photovoltaic modules.
Figure 8B:
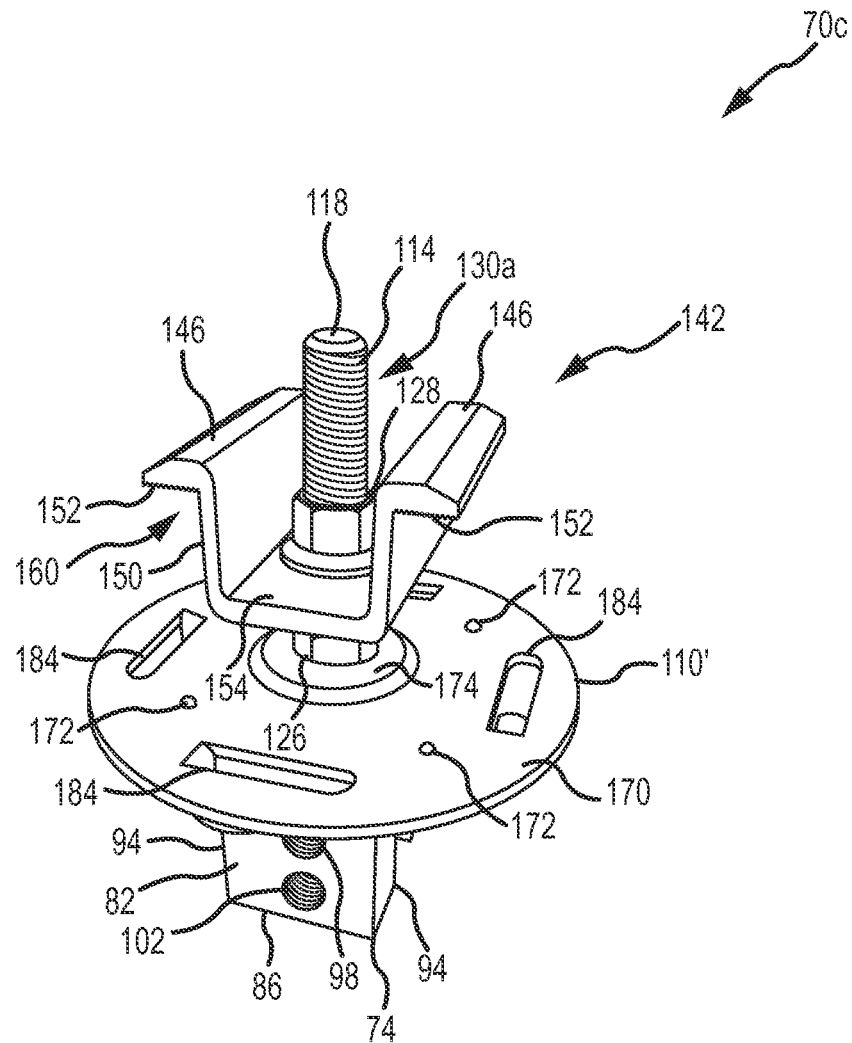
FIG. 8B is one top-based perspective view of the mounting assembly of FIG. 8A.
Figure 8C:
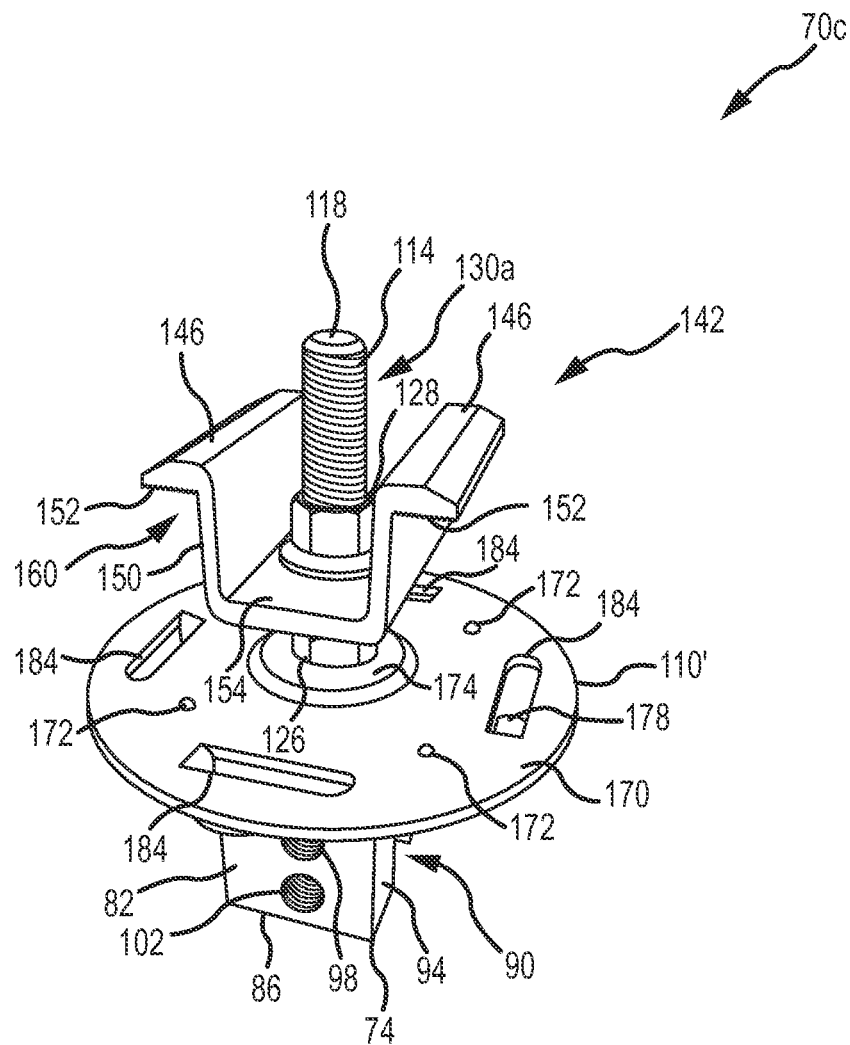
FIG. 8C is another one top-based perspective view of the mounting assembly of FIG. 8A.
Figure 8D:
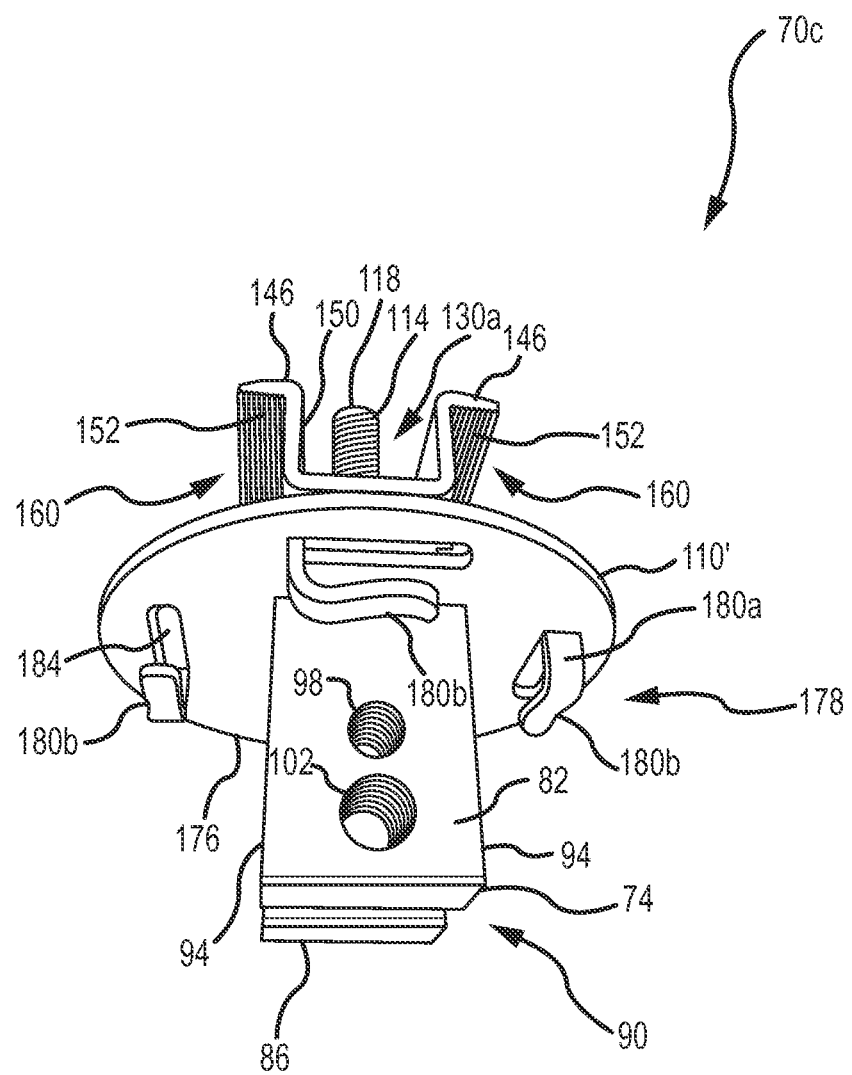
FIG. 8D is a bottom-based perspective view of the mounting assembly of FIG. 8A.
Figure 8E:
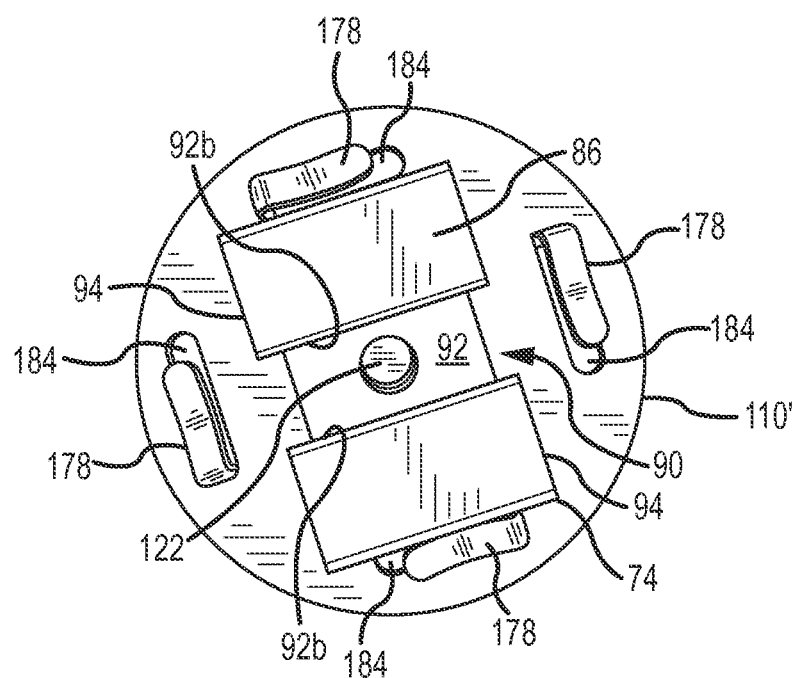
FIG. 8E is a plan view of a bottom of the mounting assembly of FIG. 8A.
Figure 8F:
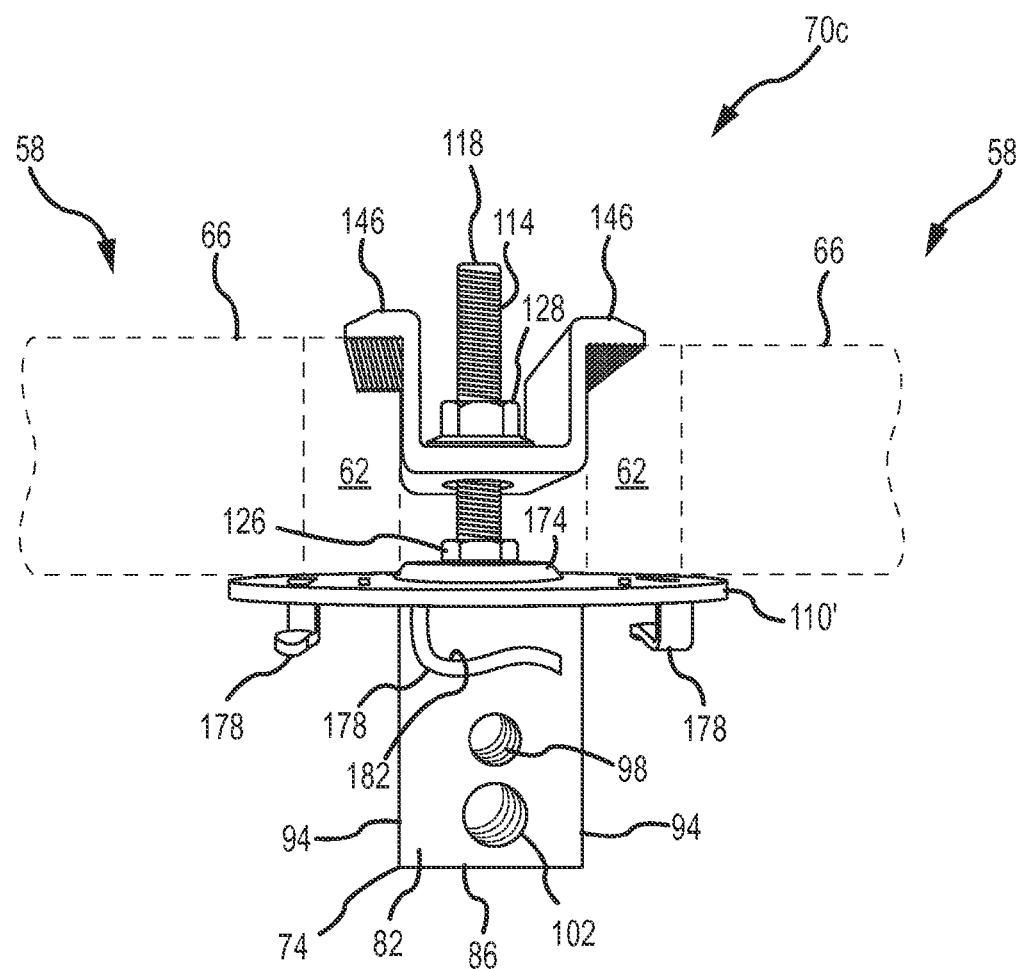
FIG. 8F is another side-based perspective view of the mounting assembly of FIG. 8A, and schematically illustrating the engagement of a pair of photovoltaic modules.

FIG. 8F schematically illustrates the positional registration/alignment function provided by the raised structure 174 of the mounting plate 110'. Here the frame 62 of one photovoltaic module 58 being clamped by the mounting assembly 70*c* abuts one portion on a perimeter of the raised structure 174, while the frame 62 of another photovoltaic module 58 being clamped by the mounting assembly 70*c* is disposed adjacent to (or possibly abutting with) an oppositely disposed portion on the perimeter of the raised structure 174. In one embodiment, the width or outer diameter of the raised structure 174 is the same as or slightly larger than the spacing between the two extensions 150 of the clamping member 142. In any case, the raised structure 174 should be sized such that when an adjacent pair of photovoltaic modules 58 are positioned to abut oppositely disposed portions on the perimeter of the raised structure 174, the clamping member 142 should be positionable on the stud 114 and should properly engage these photovoltaic modules.

At least one grounding projection 172 of the mounting plate 110' shown in FIG. 8F should be engaged with the frame 62 of one photovoltaic module 58 shown in FIG. 8F, and at least one other grounding projection 172 of this same mounting plate 110' should be engaged with the frame 62 of the other photovoltaic module 58 shown in FIG. 8F. This again provides electrical continuity between the two modules 58 shown in FIG. 8F—an electrical path exists from one module 58 to the other module 58 via the mounting plate 110' and each grounding projection 172 that is engaged with either of the modules 58.

Figure 9A:
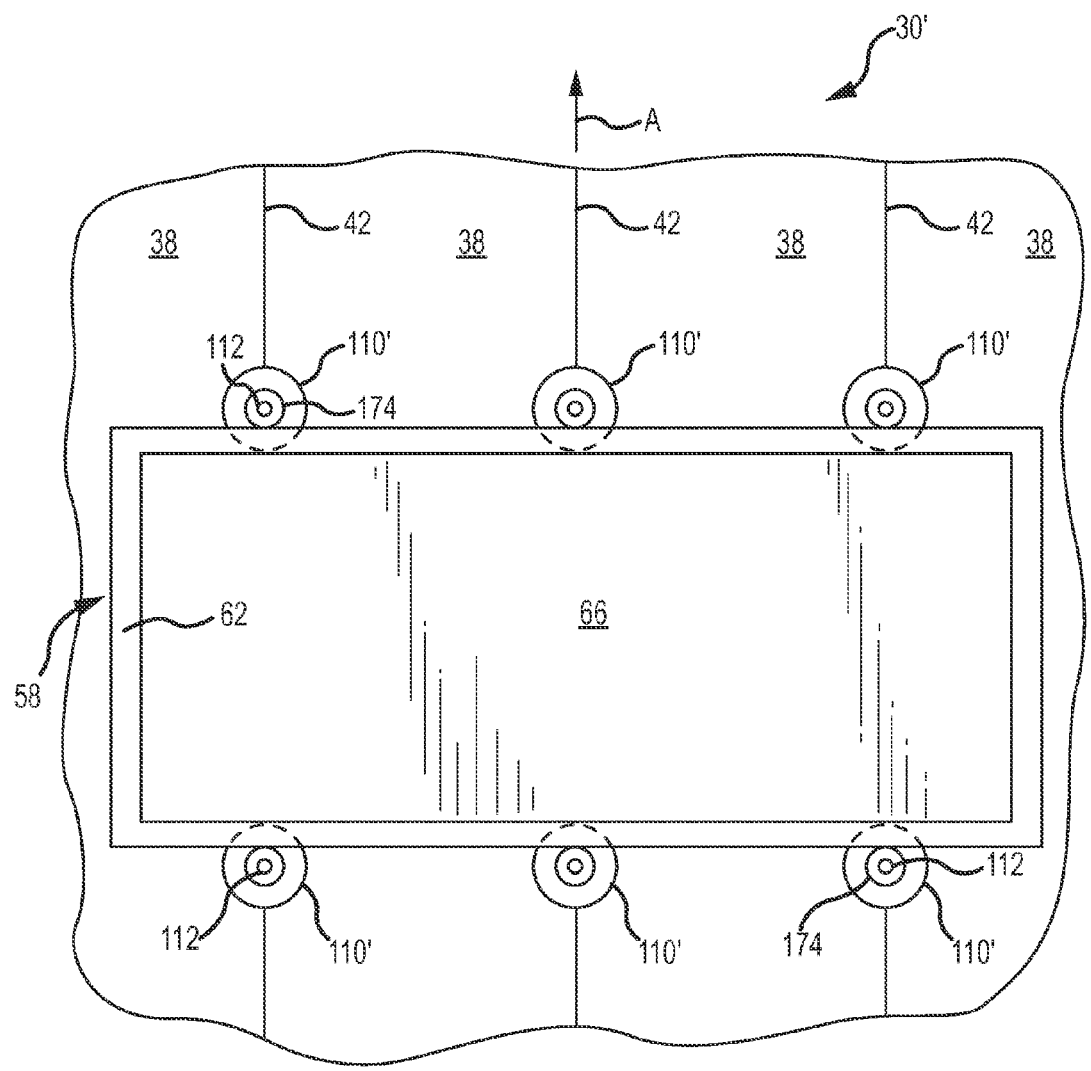
FIG. 9A is a plan view of one embodiment of a photovoltaic system using a plurality of the mounting assemblies of FIGS. 8A-F, and with the clamping members being removed to illustrate a positional registration function incorporated by the mounting plate of such mounting assemblies.

FIG. 9A illustrates the positional registration or alignment function provided by the mounting plate 110' incorporating a raised structure 174 (which thereby may be referred to as a PV module positional registrant). In FIG. 9A, the mounting devices 74 are attached to the standing seams 42 such that the frame 62 of the photovoltaic module 58 engages a portion on the outer perimeter of the raised structure 174. The clamping member 142 for each such mounting device 74 should not only be in proper position to adequately engage the frame 62 of the photovoltaic module 58 shown in FIG. 9A, but the clamping member 142 for each such mounting device 74 should also be in proper position to adequately engage the frame 62 of another photovoltaic module 58 that would be positioned in the uphill direction A (e.g., the arrow A indicating the direction of increasing elevation) from the illustrated photovoltaic module 58. The frame 62 of this "uphill" photovoltaic module 58 would likely engage an opposing portion of the raised structure 174 (or be disposed in closely spaced relation thereto). Any "downward drifting" of this uphill photovoltaic module 58 should be stopped by engaging the raised structure 174 of the "downhill" mounting assemblies 70*c*.

Figure 9B:
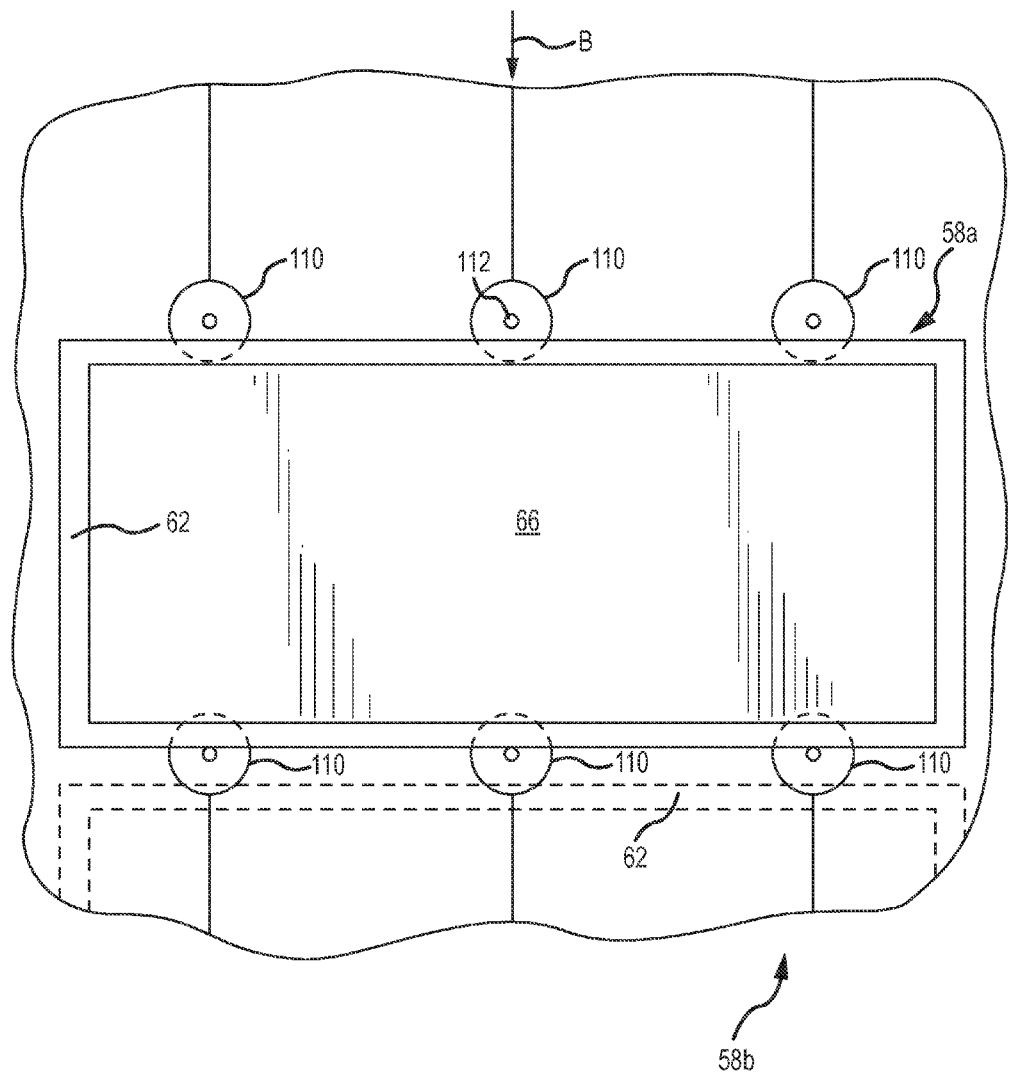
FIG. 9B is a plan view of a photovoltaic system using a plurality of the mounting assemblies of FIG. 6, and with the clamping members being removed therefrom to illustrate how a misaligned mounting assembly can affect the ability of the same to clamp onto one or more photovoltaic modules.

Now compare FIG. 9A to FIG. 9B. In FIG. 9B, the mounting assembly 70*a* has been used, and whose mounting plate 110 does not incorporate the raised structure 174 from the mounting plate 110' of FIGS. 8A-F. Here it can be seen that the uphill photovoltaic module 58*a* (the arrow B in FIG. 9B indicating the downhill direction, or direction of decreasing elevation) has been positioned relative to the three lower mounting devices 74 such that its frame 62 is quite close to the hole 112 of the three lower mounting plates 110 (through which the stud 114 is directed to threadably engage the mounting device 74). The three clamping members 142 associated with these three "downhill" mounting plates 110 now may not sufficiently engage the downhill photovoltaic module 58*b*.

Figure 10A:
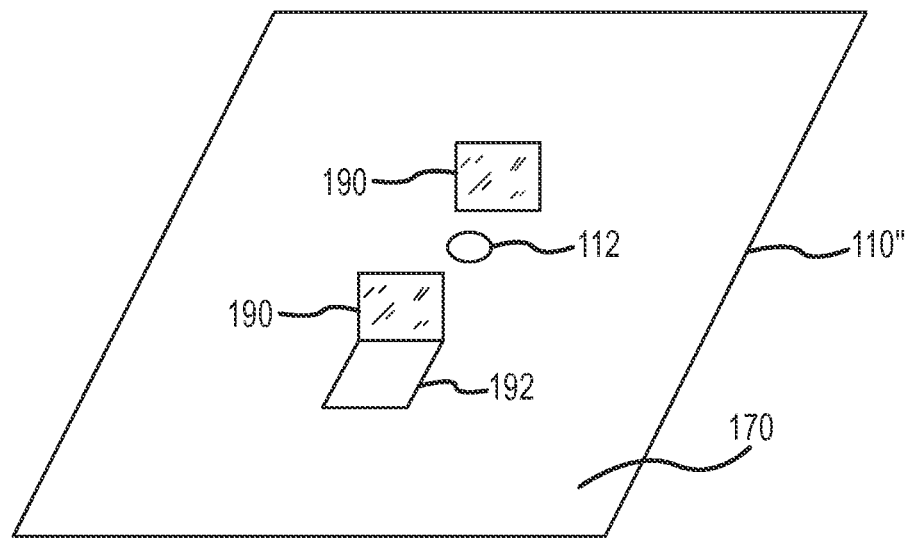
FIG. 10A is a perspective view of another embodiment of a mounting plate that incorporates a discrete pair of PV module positional registrants.
Figure 10B:
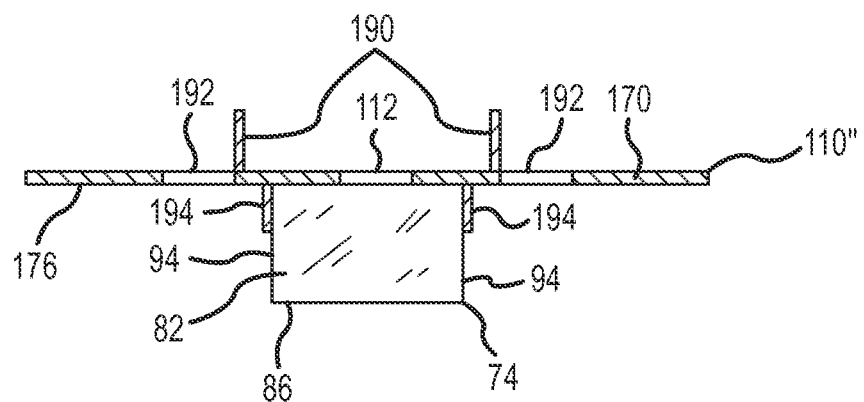
FIG. 10B is a side view of the mounting plate of FIG. 10 disposed on a mounting device, where the mounting plate includes a pair of mounting device positional registrants.

The mounting plate 110' from the mounting assembly 70*c* of FIGS. 8A-F uses a single raised structure 174 to provide a positional registration or alignment function for each of the two photovoltaic modules that may be clamped by a single mounting assembly 70*c*. Other types of positional registration or alignment features may be incorporated by a mounting plate. One representative embodiment is illustrated in FIGS. 10A-B in the form of a mounting plate 110". Generally, the mounting plate 110" may be used in place of the mounting plate 110' discussed above. Although not shown, it should be appreciated that the mounting plate 110" may also utilize the grounding projections 172 and/or wiring clips 178 (and their associated apertures 184).

The mounting plate 110" of FIGS. 10A and 10B differs from the mounting plate 110' of FIGS. 8A-F in a number of respects. One is the shape of the mounting plate 110'. Each of these mounting plates 110', 110" may be of any appropriate shape in relation to their respective outer perimeters (e.g., circular as in the case of the mounting plate 110'; square as in the case of the mounting plate 110"; rectangular). Another is that the mounting plate 110" utilizes at least two discrete PV module positional registrants 190. Each of the PV module positional registrants 190 may be of any appropriate size, shape, and/or configuration. The PV module positional registrants 190 may be integrally formed with a remainder of the mounting plate 110" as shown where they have been stamped from the mounting plate 110" (creating corresponding apertures 192), or the PV module registrants 190 could be separately attached to the mounting plate 110". When the mounting plate 110" is positioned in the proper orientation on a mounting device 74, one of the PV module positional registrants 190 may be used to position one photovoltaic module on the mounting plate 110" (e.g., by this first photovoltaic module butting up against this first PV module positional registrant 190) such that it should be adequately engaged by the clamping member 142, and furthermore such that the other or second photovoltaic module to be positioned on the mounting plate 110" should also be adequately engaged by this same clamping member 142. In this regard, this second photovoltaic module may be positioned such that it butts up against the other or second of the PV module positional registrants 190 of the mounting plate 110".

As there are only two PV module positional registrants 190 in the illustrated embodiment of FIGS. 10A and 10B, the mounting plate 110" may need to be in a certain angular position or orientation on the mounting device 74 such that they provide a positional registration or alignment function for the two photovoltaic modules to be clamped by the associated mounting assembly. An installer could be required to place the mounting plate 110" onto the mounting device 74 in the correct angular position or orientation. Another option is for the mounting plate 110" to include one or more mounting device positional registrants 194 that facilitate the positioning of the mounting plate 110" onto the upper surface 78 of the mounting device 74 such that the PV module positional registrants 190 should be positioned to provide a positional registration or alignment function for the two photovoltaic modules to be clamped by the associated mounting assembly. In the illustrated embodiment, the mounting plate 110" includes a pair of mounting device positional registrants 194—a separate mounting device positional registrant 194 for each of the two opposite ends 94 of the mounting device 74 (e.g., one mounting device positional registrant 194 may engage one end 94 of the mounting device 74, and another mounting device positional registrant 194 may engage the opposite end 94 of the mounting device 74). A pair of mounting device positional registrants could be utilized by the mounting plate 110" and that engage the two opposite side surfaces 82 of the mounting device 74 to place the mounting plate 110" in the correct angular position relative to the mounting device 74. Yet another option would be to have at least one mounting device positional registrant for the mounting plate 110" that engages an end 94 of the mounting device 74 and at least one mounting device positional registrant for the mounting plate 110" that engages one of the side surfaces 82 of the mounting device 74. Any appropriate way of positionally registering the mounting plate 110" relative to the mounting device 74 may be utilized.

Figure 11:
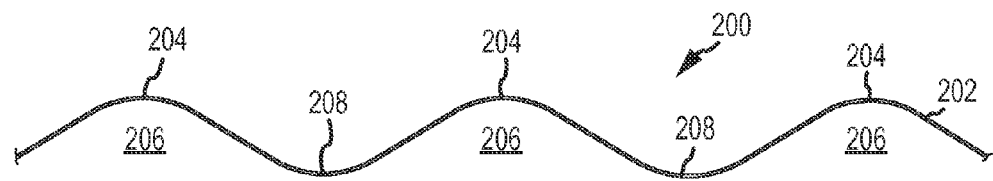
FIG. 11 is an end view of part of a representative corrugated panel.

Standing seam panels 38 were addressed above. Other types of panels are commercially available. Another example of a panel configuration is commonly referred to as a corrugated panel (e.g., formed from an appropriate metal or metal alloy). A representative corrugated panel is illustrated in FIG. 11 and is identified by reference numeral 202. A plurality of corrugated panels 202 may be assembled to define a building surface or a corrugated panel surface 200 (e.g., a roof or roofing surface).

A corrugated panel 202 is defined by a plurality of panel crowns 204 and a plurality of panel valleys 208. In the illustrated embodiment, a panel valley 208 is disposed between each adjacent pair of panel crowns 204. The corrugated panel 202 may be of a sinusoidal or "sine wave" configuration in an end view (FIG. 11). In any case, typically a corrugated panel 202 will be installed in a roofing application such that the length dimension of its panel crowns 204 and panel valleys 208 each extend along the roof pitch (e.g., the elevation of each panel crown 204 and each panel valley 208 may continually change proceeding along its length dimension). A "panel crown" 204 of a corrugated panel 202 may also be referred to as a "rib" or "the high." A "panel valley" 208 of a corrugated panel 202 may also be referred to as a "trough" or "the low."

Figure 12A:
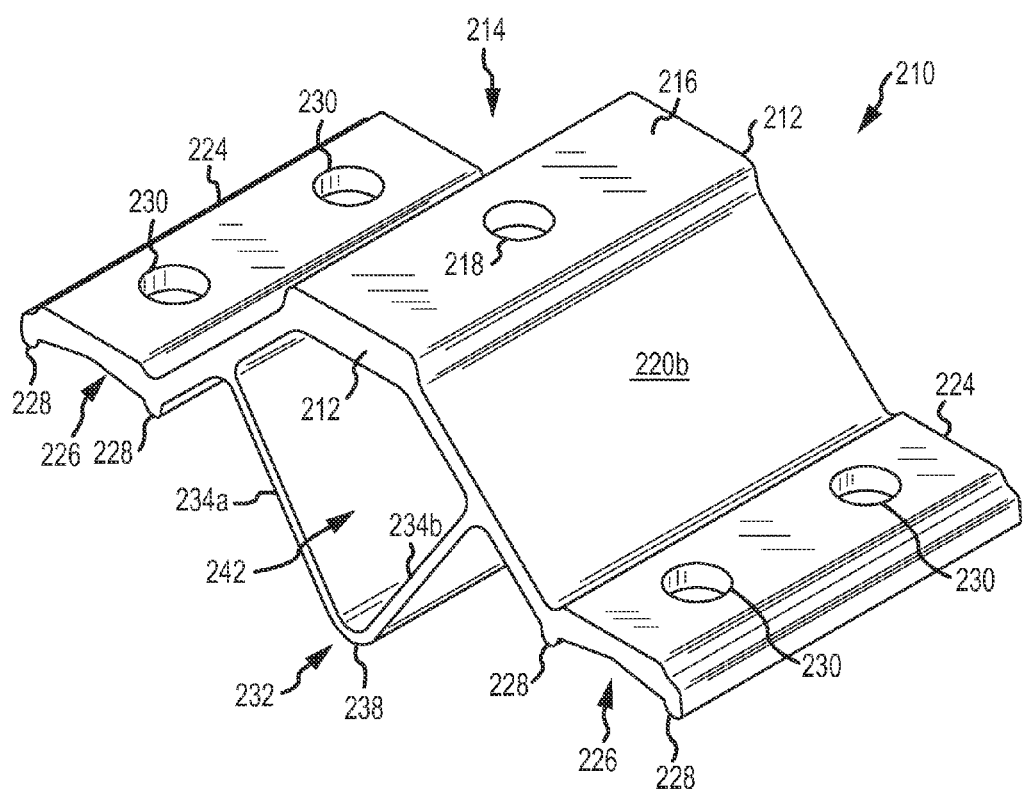
FIG. 12A is a perspective view of one embodiment of a mounting bracket for use with corrugated panels.
Figure 12B:
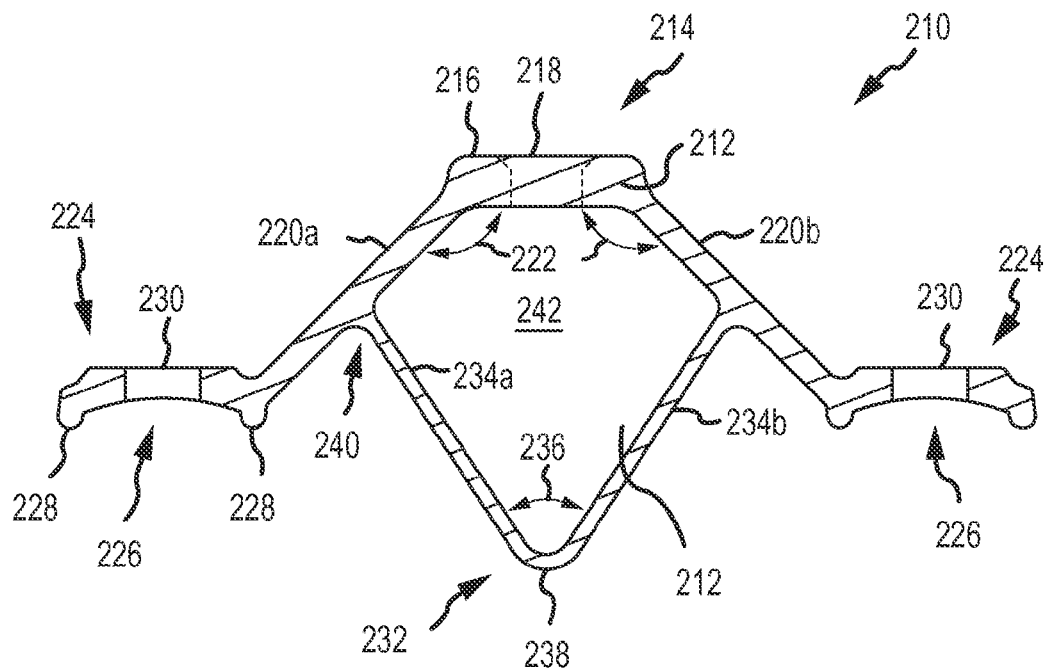
FIG. 12B is a cross-sectional view of the mounting bracket of FIG. 12A.
Figure 12C:
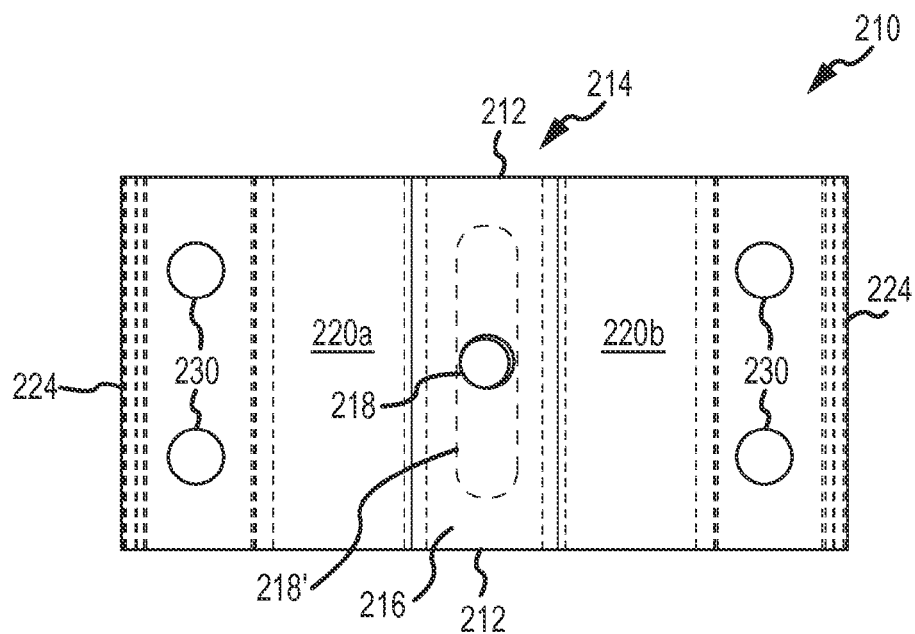
FIG. 12C is a top view of the mounting bracket of FIG. 12A.

One embodiment of a mounting device that is adapted for use with corrugated panels is illustrated in FIGS. 12A-C, and may be used to install various types of attachments on such corrugated panels. The mounting device shown in FIGS. 12A-C is in the form of a mounting bracket 210 that may be of one-piece construction (e.g., no joint of any kind between any adjacent portions of the mounting bracket 210; the mounting bracket 210 is not an assembly of two or more separately-formed and separately-joined portions). In one embodiment, the mounting bracket 210 is in the form of extrusion to provide such a one-piece construction. The mounting bracket 210 may be formed from any appropriate material or combination of materials (e.g., an aluminum alloy; other metal alloys).

The mounting bracket 210 includes what may be characterized as a valley section 214 that is positioned above a panel valley 208 when the mounting bracket 210 is positioned on a corrugated panel 202 (e.g., FIGS. 12D-F, discussed below). In the illustrated embodiment, the entirety of the valley section 214 is defined by an upper wall or mounting surface 216. The upper wall 216 is the uppermost portion of the mounting bracket 210 when disposed in an upright position (e.g., FIG. 12B), extends between a pair of ends 212 of the mounting bracket 210, and is in the form of an at least substantially flat surface (e.g., having a rectangular perimeter in the illustrated embodiment). In one embodiment, the perimeter of the upper wall 216 defines an area of at least 2.5 inches$^2$ to provide an appropriate surface for supporting attachments of any appropriate type (discussed below). In this regard, the upper wall 216 includes a mounting hole 218 that extends completely through this upper wall 216. One or more mounting holes 218 may be used to secure at least one attachment relative to the mounting bracket 210 (e.g., using one or more attachment fasteners of any appropriate type).

A single mounting hole 218 is shown in the illustrated embodiment (e.g., located equidistantly from the two ends 212, although such may not be required in all instances). Multiple mounting holes could be incorporated by the upper wall 216 if required by a particular application or if otherwise desired. Each given mounting hole 218 may be threaded or unthreaded. In the case of a threaded mounting hole 218, a threaded attachment fastener (e.g., a threaded stud or bolt) could have its threads engaged with the threads of a particular mounting hole 218 to secure at least one attachment relative to the mounting bracket 210. An attachment fastener could also extend through a particular mounting hole 218 without having any type of threaded engagement with the mounting bracket 210, and a nut could be threaded onto an end of this attachment fastener (this end being disposed within an open space 242 of the mounting bracket 210, discussed below) to secure at least one attachment relative to the mounting bracket 210.

Any appropriate configuration may be utilized by each mounting hole 218 through the upper wall 216 of the mounting bracket. Representative configurations for each mounting hole 218 include circular or round. A given mounting hole could also be in the form of an elongated slot 218', as shown in FIG. 12C.

The above-noted bracket ends 212 may be characterized as being spaced along a length dimension of the mounting bracket 210 (e.g., the spacing between the bracket ends 212 may define the length of the mounting bracket 210). When the mounting bracket 210 is positioned on a corrugated panel 202 (e.g., FIGS. 12D-F, discussed below), the length dimension of the mounting bracket 210 will be aligned or coincide with (e.g., parallel to) the length dimension of the corresponding panel valley 208 (e.g., one bracket end 212 will be at one location along the length dimension of the corresponding panel valley 208, while the opposite bracket end 212 will be at a different location along the length dimension of this same panel valley 208).

The mounting bracket 210 further includes a pair of bracket legs 220a, 220b. The bracket leg 220a extends from one side of the valley section 214 (the upper wall 216 in the illustrated embodiment), while the other bracket leg 220b extends from the opposite side of the valley section 214 (the upper wall 216 in the illustrated embodiment). Each bracket leg 220a, 220b may be characterized as extending both downwardly and away from its corresponding side of the valley section 214 when the mounting bracket 220 is in an upright position (e.g., FIG. 12B). Another characterization is that the bracket leg 220a extends from the valley section 214 at least generally in the direction of one panel crown 204 of a corrugated panel 202 on which the mounting bracket 210 is positioned (e.g., FIGS. 12D-F, discussed below), while the bracket leg 220b extends from the valley section 214 at least generally in the direction of another panel crown 204 of a corrugated panel 202 on which the mounting bracket 210 is positioned (e.g., FIGS. 12D-F, discussed below).

The upper wall 216 and the two bracket legs 220a, 220b may be characterized as collectively defining a hollow interior 240 for the mounting bracket 210. An included angle 222 is defined between the underside of the upper wall 216 and each of the bracket legs 220a, 220b. In the illustrated embodiment, the included angle 222 associated with each of the bracket legs 220a, 220b is greater than 90°. The bracket legs 220a, 220b may be the mirror image of each other with regard to their respective orientations (e.g., the included angle 222 associated with the bracket leg 220a may be of the same magnitude as the included angle 222 associated with the other bracket leg 220b).

The mounting bracket 210 further includes a third bracket leg 234a that extends from the first bracket leg 220a within the hollow interior 240 of the mounting bracket 210, along with a fourth bracket leg 234b that extends from the second bracket leg 220b within the hollow interior 240 of the mounting bracket 210. The bracket legs 234a, 234b may converge to define a panel valley engagement section 232. Stated another way, the intersection of the third bracket leg 234a and the fourth bracket leg 234b may define a panel valley engagement section 232 for the mounting bracket 210. This defines an included angle 236 between the third bracket leg 234a and the fourth bracket leg 234b. In the illustrated embodiment, the magnitude of this included angle 236 is less than 90°.

The panel valley engagement section 232 includes what may be characterized as a panel valley interface surface 238—the surface of the panel valley engagement section 232 that interfaces with a panel valley 208 of a corrugated panel 202 when the mounting bracket 210 is positioned on such a corrugated panel 202. In the illustrated embodiment, the panel valley interface surface 238 is convex or of a "rounded" configuration.

The upper wall 216 of the mounting bracket 210 may be characterized as being disposed in overlying relation to the panel valley engagement section 232. The upper wall 216 may also be characterized as being separated from the panel valley engagement section 232 by an open space 242 (the open space 242 being within or part of the hollow interior 240 of the mounting bracket 210). In one embodiment, the vertical extent of this open space 242 (i.e., "vertical" being when the mounting bracket 210 is disposed in an upright position, and also coinciding with the dimension that is orthogonal/perpendicular to the pitch of a roofing defined by a corrugated panel 202 on which the mounting bracket 210 is positioned) is at least about 1 inch. That is, the underside of the upper wall 216 may be separated from the panel valley engagement section 232 by a distance of at least about 1 inch in at least one embodiment.

The mounting hole 218 in the upper wall 216 may be characterized as being aligned in the vertical dimension with the panel valley engagement section 232 when the mounting bracket 210 is disposed in an upright position. The open space 242 also therefore exists between the mounting hole 218 and the panel valley engagement section 232 (e.g., the mounting hole 218 may be aligned with the open space 242 in the vertical dimension; the open space 242 may be characterized as being below the mounting hole 218). As such, an attachment fastener may be directed within the mounting hole 218, may extend through the upper wall 216, and may terminate within the open space 242. That is, such an attachment fastener could extend beyond the underside of the upper wall 216 a distance of at least about 1" in the noted embodiment before contacting another portion of the mounting bracket 210 (e.g., the side of the panel valley engagement section 232 that is opposite of the panel valley interface surface 238).

The mounting bracket 210 also includes a pair of panel crown engagement sections 224. Initially, each panel crown engagement section 224 is offset or spaced in the vertical dimension from the panel valley engagement section 232. Stated another way and when the mounting bracket 214 is disposed in an upright position, the panel valley engagement section 232 is disposed at a different elevation than each panel crown engagement section 224 (each panel crown engagement section 224 being disposed at a higher elevation than the panel valley engagement section 232). Moreover, the panel valley engagement section 232 is offset from each panel crown engagement section 224 in a lateral dimension that is orthogonal to the above-noted vertical dimension (e.g., the lateral dimension coinciding with the horizontal dimension in the view of FIG. 12B).

The first bracket leg 220a extends between one of the panel crown engagement sections 224 and the valley section 214. Similarly, the second bracket leg 220b extends between the other panel crown engagement section 224 and the valley section 214. As will be discussed in more detail below, one panel crown engagement section 224 of the mounting bracket 210 may be positioned on one panel crown 204 of a corrugated panel 202 (located on one side of a panel valley 208 engaged by the panel valley engagement section 232), while the other panel crown engagement section 224 may be positioned on a different panel crown 204 of a corrugated panel 202 (located on the opposite side of a panel valley 208 engaged by the panel valley engagement section 232). In the illustrated embodiment, each panel crown engagement section 224 engages the adjacent-most panel crown 204 to the panel valley 208 contacted by the panel valley engagement section 232 of the mounting bracket 210, although such may not be required in all instances.

Each panel crown engagement section 224 may engage a panel crown 204 of a corrugated panel 202 on which the mounting bracket 210 is positioned. In the illustrated embodiment, there may be two discrete zones of contact between each panel crown engagement section 224 and its corresponding panel crown 204. In this regard, each panel crown engagement section 224 may include a pair of rails, projections, or dimples 228 that may extend between the two ends 212 of the mounting bracket 210. If the spacing between the two ends 212 is characterized as the length dimension for the mounting bracket 210, each projection 228 may be characterized as extending along at least part of the length of the mounting bracket 210. Each projection 228 may be convex or rounded where engaged with a corresponding panel crown 204.

Each projection 228 may provide a discrete zone of contact (e.g., extending along a line or axial path) between the corresponding panel crown engagement section 224 and its corresponding panel crown 204 of a corrugated panel 202. Generally, the use of the projections 228 reduces the area of contact between the mounting bracket 210 and a panel crown 204 of a corrugated panel 202, which should reduce the potential for capillary entrapment (e.g., should reduce the potential of water "wicking" into interfacing surfaces of the mounting bracket 210 and a corrugated panel 202, which could lead to the development of corrosion and premature failure of a building surface 200 incorporating such a corrugated panel 202).

A gasket pocket or receptacle 226 is defined between the projections 228 on each of the panel crown engagement sections 224. At least one bracket fastener hole 230 extends through each of the panel crown engagement sections 224 and intersects the corresponding gasket pocket 226. In the illustrated embodiment, there are two bracket fastener holes 230 that are aligned with the gasket pocket 226 for each of the panel crown engagement sections 224. Any appropriate number of bracket fastener holes 230 may be utilized by each panel crown engagement section 224. In one embodiment, each bracket fastener hole 230 is un-threaded. An appropriate bracket fastener (e.g., threaded screw, rivet) may be directed through each bracket fastener hole 230 and through the aligned portion of a corrugated panel 202 to secure the mounting bracket 210 relative to the corrugated panel 202. Various options in this regard will be discussed in more detail below in relation to FIGS. 12D-F.

A gasket of any appropriate type (e.g., an EPDM gasket—not shown) may be disposed within each of the gasket pockets 226. The projections 228 on each panel crown engagement section 224 should confine the corresponding gasket therebetween. In one embodiment, each gasket that is positioned within a gasket pocket 226 is thicker than the depth of its corresponding gasket pocket 226 prior to the mounting bracket 210 being secured relative to a corrugated panel 202. As such, the gaskets may be compressed between the mounting bracket 210 and the corresponding panel crown 204 as the mounting bracket 210 is secured relative to a corrugated panel 202. The above-described projections 228 may also provide the function of reducing the potential of these gaskets being "over-compressed" while securing the mounting bracket 210 relative to a corrugated panel 202.

Each gasket may be installed within its corresponding gasket pocket 226 prior to installing the mounting bracket 210 on a corrugated panel 202. Any appropriate way of maintaining a gasket within its corresponding gasket pocket 226 may be utilized (e.g., by being press fit within the corresponding gasket pocket 226; adhering a gasket 226 to an inner surface of its corresponding gasket pocket 226). When the mounting bracket 210 is secured relative to a corrugated panel 202, each gasket may compress to bring the above-noted projections 228 into contact with the corresponding panel crown 204 of the corrugated panel 202. However, the projections 228 should still at least substantially confine the corresponding gasket within its corresponding gasket pocket 226, and furthermore should reduce the potential for the gaskets being over-compressed during installation as noted.

Figure 12D:
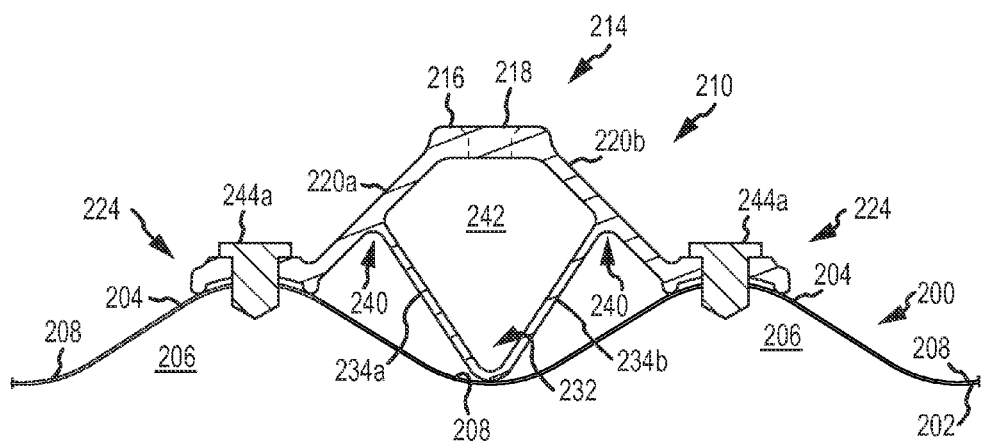
FIG. 12D is a cross-sectional view of the mounting bracket of FIG. 12A when installed on a corrugated panel for a first installation configuration, where bracket fasteners are anchored only in the sheeting of the corrugated panel.

FIG. 12D illustrates how the above-described mounting bracket 210 may be positioned or "seated" on a corrugated panel 202. Generally: 1) the panel valley engagement section 232 of the mounting bracket 210 is engaged with one panel valley 208 of the corrugated panel 202; 2) one panel crown engagement section 224 of the mounting bracket 210 is positioned on one panel crown 204 on one side of this same panel valley 208 (the adjacent-most panel crown 204 in the illustrated embodiment, although such may not be required in all instances); and 3) the other panel crown engagement section 224 of the mounting bracket 210 is positioned on one panel crown 204 on the opposite side of this same panel valley 208 (the adjacent-most panel crown 204 in the illustrated embodiment, although such may not be required in all instances).

FIG. 12D also illustrates one manner of securing the mounting bracket 210 relative to a corrugated panel 202. A separate bracket fastener 244a (e.g., a threaded screw) may be directed through each bracket fastener hole 230 of each panel crown engagement section 224, through a corresponding portion of the panel crown 204 of the corrugated panel 202, and may terminate within a hollow interior 206 located "under" this panel crown 204. In this case, the mounting bracket 210 is secured only to the sheeting that defines the corrugated panel 202.

Figure 12E:
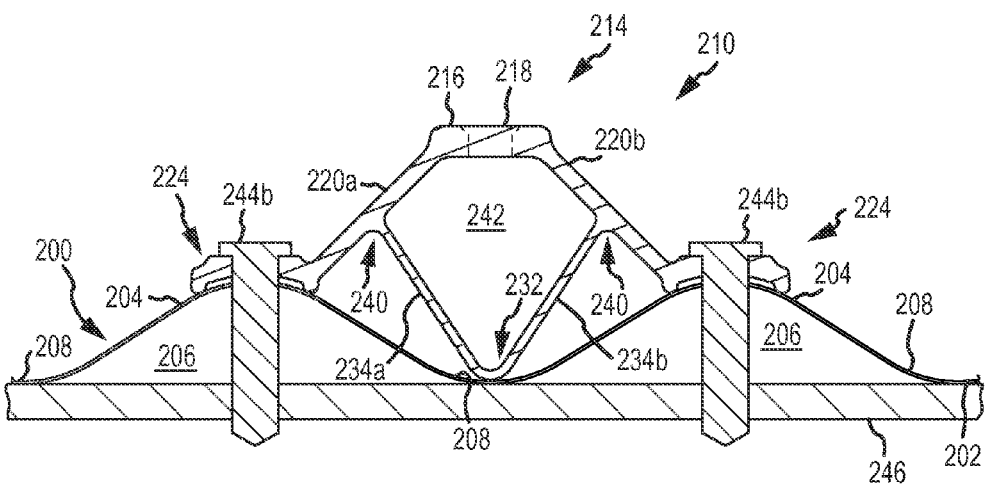
FIG. 12E is a cross-sectional view of the mounting bracket of FIG. 12A when installed on a corrugated panel for a second installation configuration, where bracket fasteners are anchored in a deck that supports the corrugated panel.

FIG. 12E illustrates another option for securing a mounting bracket 210 relative to a corrugated panel 202. Here, the corrugated panel 202 is positioned on a deck 246 or other substrate—the underside of each panel valley 208 of the corrugated panel 202 may contact the deck 246. This deck 246 may be formed from any appropriate material or combination of materials (e.g., wood, for instance plywood). In this case, a separate bracket fastener 244b (e.g., threaded screw) may be directed through each bracket fastener hole 230 of each panel crown engagement section 224, through a corresponding portion of the panel crown 204 of the corrugated panel 202, through the corresponding hollow interior 206, and may be anchored to the deck 246 (e.g., each such bracket fastener 244b at least extends within the deck 246, and may in fact extend completely through the deck 246). Here, the mounting bracket 210 may be characterized as being secured to both the sheeting of the corrugated panel 202, as well as to the underlying deck 246.

The installation configuration shown in FIG. 12E provides a number of advantages over the installation configuration shown in FIG. 12D. One is the additional securement of the mounting bracket 210 relative to the corrugated panel 202 provided by anchoring the mounting bracket 210 to the underlying deck 246 (versus just to the sheeting of the corrugated panel 202, as in the FIG. 12D configuration). Another is that the panel valley engagement section 232 should reduce the potential that the two panel crowns 204 (engaged by the panel crown engagement sections 224 of the mounting bracket 210) will collapse as the bracket fasteners 244b are anchored to the deck 246 in the above-described manner. That is, the panel valley engagement section 232 should reduce the potential of "over-tightening" the bracket fasteners 244b to the extent that could affect the structural integrity of the corresponding panel crown 204 (e.g., by at least partially collapsing such a panel crown 204).

Figure 12F:
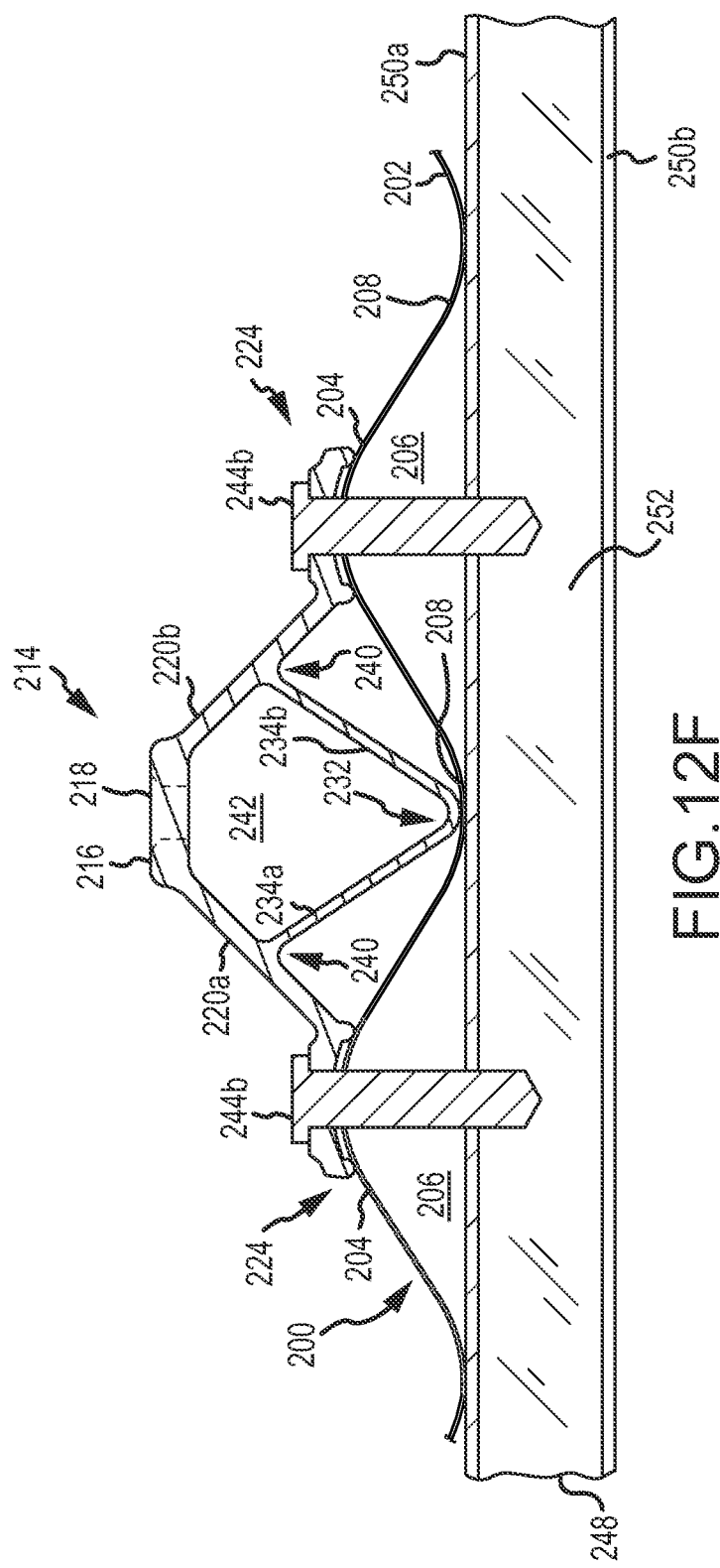
FIG. 12F is a cross-sectional view of the mounting bracket of FIG. 12A when installed on a corrugated panel for a third installation configuration, where bracket fasteners are anchored in a Z-shaped purlin that supports the corrugated panel.

FIG. 12F illustrates yet another option for securing a mounting bracket 210 relative to a corrugated panel 202. Here, the corrugated panel 202 is positioned on a plurality of purlins 248 (only one shown in FIG. 12F). The length dimension of these purlins 248 are disposed orthogonal or perpendicular to the length dimension of the panel crowns 204 and panel valleys 208 of the corrugated panel 202. Each such purlin 248 may be formed from any appropriate material or combination of materials (e.g., a metal or metal alloy), and is commonly referred to in the art as being "Z-shaped."

Figure 12G:
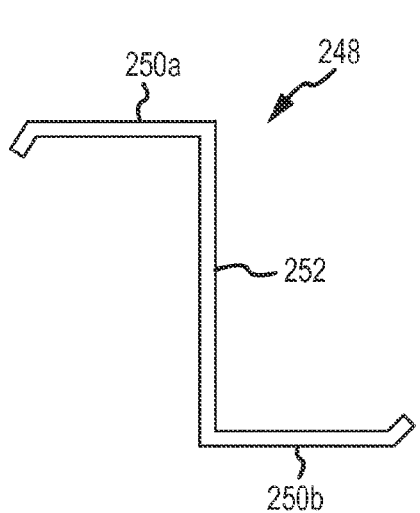
FIG. 12G is an end view of the Z-shaped purlin shown in FIG. 12F.

An end view of the purlin 248 from FIG. 12F is presented in FIG. 12G. Generally, the purlin 248 includes a pair of flanges 250a, 250b that are spaced from one another, but that are connected by an intermediate web 252. The flange 250a of the purlin 248 may engage the underside of the corrugated panel 202. That is, the various panel valleys 208 of the corrugated panel 202 may be positioned on the flange 250a of the purlin 248. As such, a separate bracket fastener 244b may be directed through each bracket fastener hole 230 of each panel crown engagement section 224 of the mounting bracket 210, through a corresponding portion of the panel crown 204 of the corrugated panel 202, through the corresponding hollow interior 206, and may be anchored to the upper flange 250*a* of the purlin 248 (e.g., each such bracket fastener 244*b* at least extends within the upper flange 250*a*, and may in fact extend completely through the upper flange 250*a*). Here, the mounting bracket 210 may be characterized as being secured to both the sheeting of the corrugated panel 202, as well as to one or more underlying purlins 248. The installation configuration shown in FIG. 12F provides the same advantages discussed above in relation to the installation configuration of FIG. 12E.

Figure 12H:
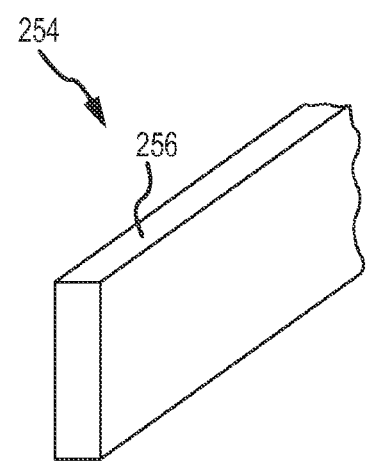
FIG. 12H is a perspective view of another embodiment of a purlin that may be used to support a corrugated panel, and that may be engaged by one or more bracket fasteners that secure the mounting bracket of FIGS. 12A-F on/relative to a corrugated panel.

The mounting bracket 210 may be anchored to purlins of any appropriate configuration. Another representative configuration is presented in FIG. 12H in the form of a purlin 254. This purlin 254 may be formed from any appropriate material or combination of materials (e.g., wood), and may be of any appropriate dimensions (e.g., a 2"×4" timber). The purlin 254 includes a panel interface surface 256 that is positioned for contact with the underside of a corrugated panel 202. As such, each bracket fastener 244*b* would be directed through this panel interface surface 256 and could terminate within the interior of the purlin 254. However, each bracket fastener 244*b* could be directed completely through the purlin 254 as well.

Figure 13:
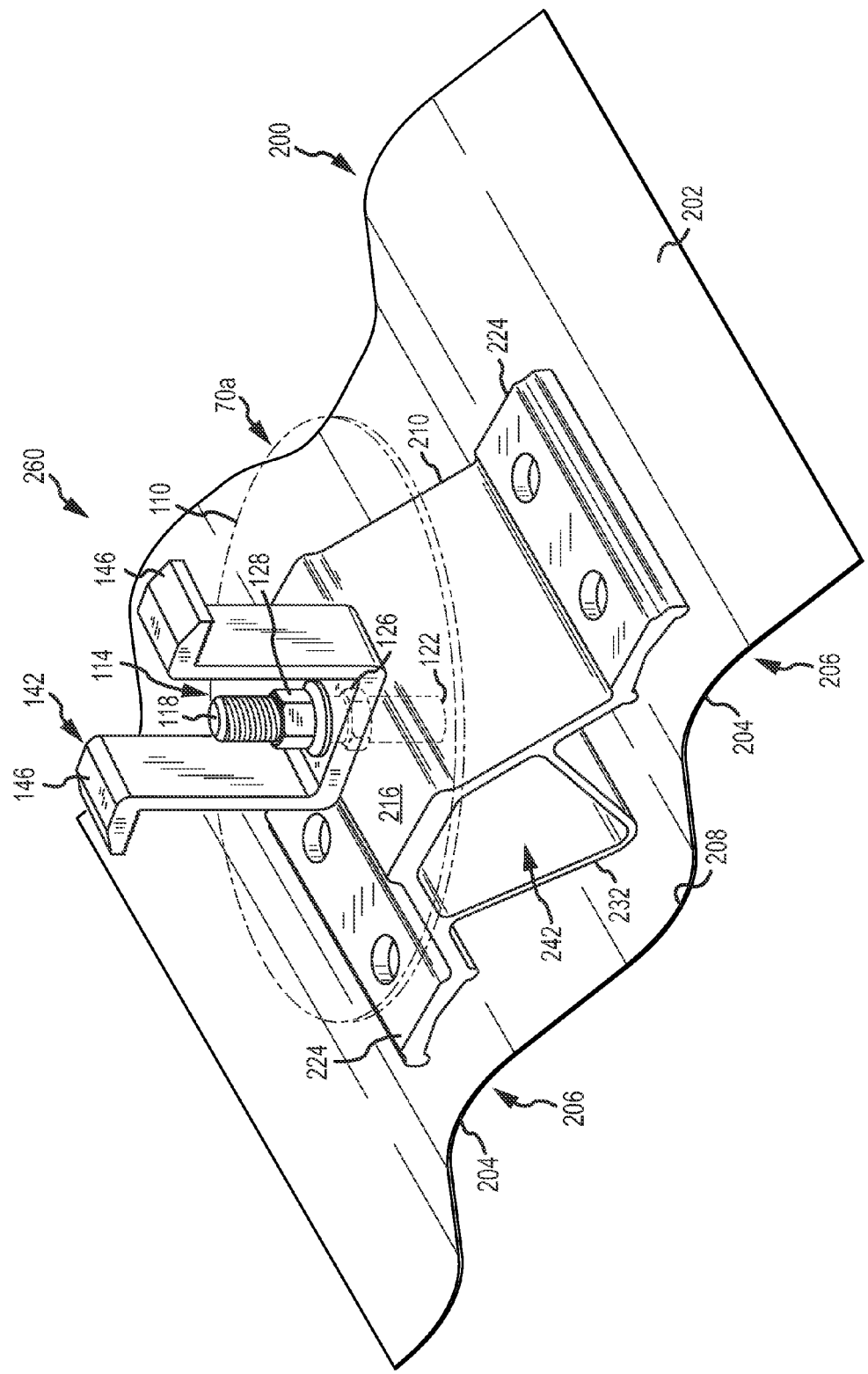
FIG. 13 is a perspective view of the mounting bracket of FIGS. 12A-F positioned on a corrugated panel, and when incorporated by the mounting assembly 70a from FIGS. 7A-B.

Various types of attachments may be installed on a building surface 200 defined by one or more corrugated panels 202 using the above-described mounting bracket 210. One example is shown in FIG. 13. One or more bracket fasteners (e.g., fasteners 244*a*, 244*b*) may be used to secure the mounting bracket 210 relative to a corrugated panel 202 (e.g., in accordance with FIGS. 12D-G). Here, a portion of the mounting assembly 70*a* (discussed above, and illustrated in FIG. 7A—the associated photovoltaic modules 58 not being shown in FIG. 13 for clarity) is installed on the mounting bracket 210 (i.e., the mounting bracket 210 may be used in place of the above-described mounting device 74 for corrugated panel configurations and for the above-noted photovoltaic module applications, as well as in conjunction with each of the above-discussed mounting assemblies (e.g., mounting 70*a-c*)). The threaded stud 114 of the mounting assembly 70*a* is engaged with the mounting hole 218 (threaded in this example) on the upper wall 216 of the mounting bracket 210. The second stud end 122 is disposed within the open space 242 of the mounting bracket 210 (e.g., so as to not contact any structure of the mounting bracket 210). The mounting assemblies 70*b*, 70*c* discussed above may be similarly mounted to the mounting bracket 210 and at least generally in the above-discussed manner. It should be appreciated that the clamping member 142 may be rotated 90° from the position illustrated in FIG. 13 to accommodate installation of one or more photovoltaic modules 58 in the above-described manner.

The clamping member 142 and mounting plate 110/110' of the mounting assemblies 70*a-c* addressed above each may be characterized as an "attachment" when secured to the mounting bracket 210 in the above-noted manner (e.g., a mounting bracket 210 secured to a corrugated panel 202, and having an attachment that is secured relative to the mounting bracket 210, may be collectively characterized as an "attachment assembly 260," with such a representative attachment assembly 260 being shown in FIG. 13). Any photovoltaic module 58 that is engaged by any such mounting assembly 70*a-c* (when incorporating a mounting bracket 210) may also be characterized as an "attachment" that is secured relative to the mounting bracket 210 using at least one attachment fastener (e.g., threaded stud 114) that is directed into a mounting hole 218 on the upper wall 216 of the mounting bracket 210, and collectively may be referred to as an "attachment assembly" as well.

Figure 14:
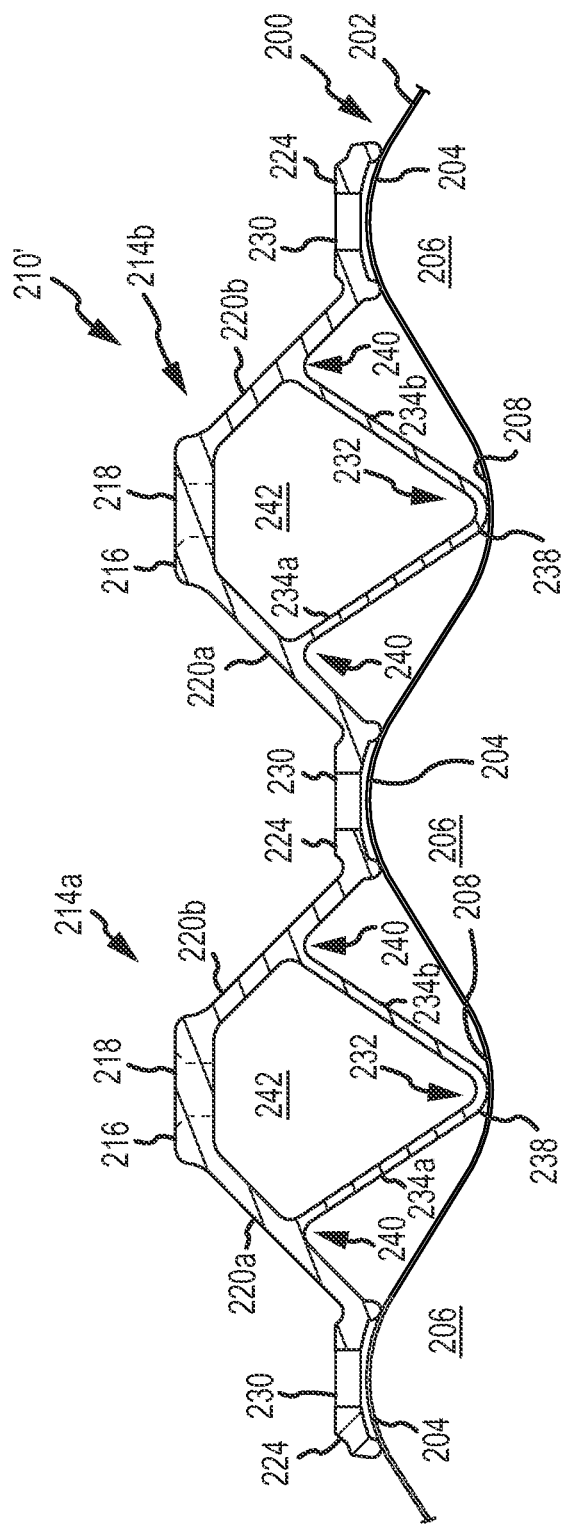
FIG. 14 is a cross-sectional view of a variation of the mounting bracket of FIGS. 12A-F, and when positioned on a corrugated panel.

A variation of the mounting bracket 210 of FIGS. 12A-F is presented in FIG. 14. Corresponding components of these two embodiments are identified by the same reference numerals, and the discussion presented above remains applicable unless otherwise noted. Those corresponding components that differ in at least some respect are identified by a "single prime" designation. In the case of the mounting bracket 210' of FIG. 14, basically two of the above-described mounting brackets 210 have been combined into a single unit to provide two valley sections 214*a*, 214*b*, each having an upper wall 216. The bracket leg 220*b* extending from the valley section 214*a* and the bracket leg 220*a* extending from the valley section 214*b* share a common panel crown engagement section 224. The mounting bracket 210' may be used in the various installation configurations discussed above in relation to FIGS. 12D-H.

The FIG. 14 configuration could also be modified to use only a single panel crown engagement section 224 (the panel crown engagement section located between the two panel valley engagement sections 232). In this case: 1) for the bracket leg 220*a* that extends from the valley section 214*a*, the portion after its intersection with the third bracket leg 234*a* could be eliminated (and its corresponding panel crown engagement section 224); and 2) for the bracket leg 220*b* that extends from the valley section 214*b*, the portion after its intersection with the fourth bracket leg 234*b* could be eliminated (and its corresponding panel crown engagement section 224).

Figure 15A:
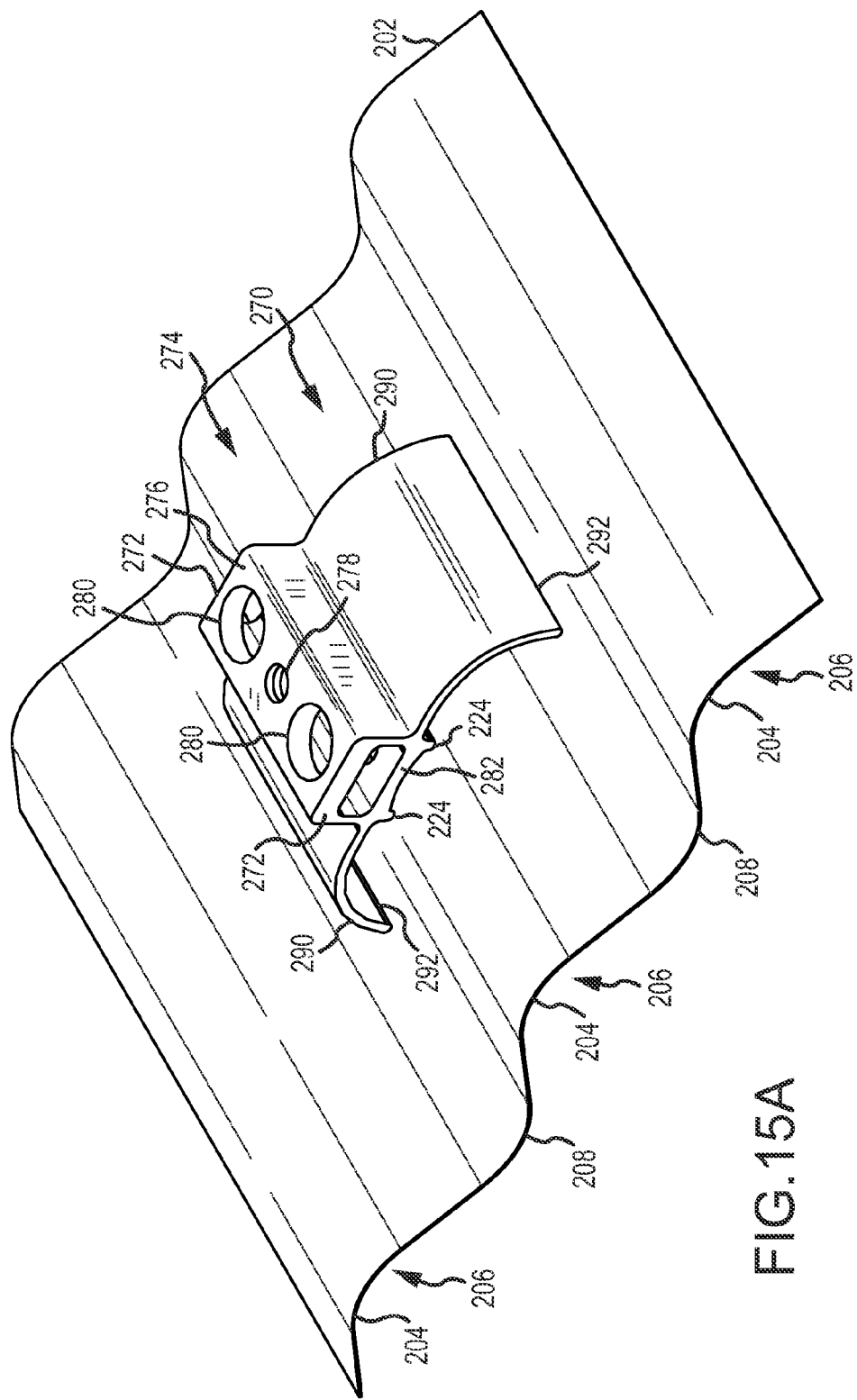
FIG. 15A is a perspective view of another embodiment of a mounting bracket for use with corrugated panels.
Figure 15B:
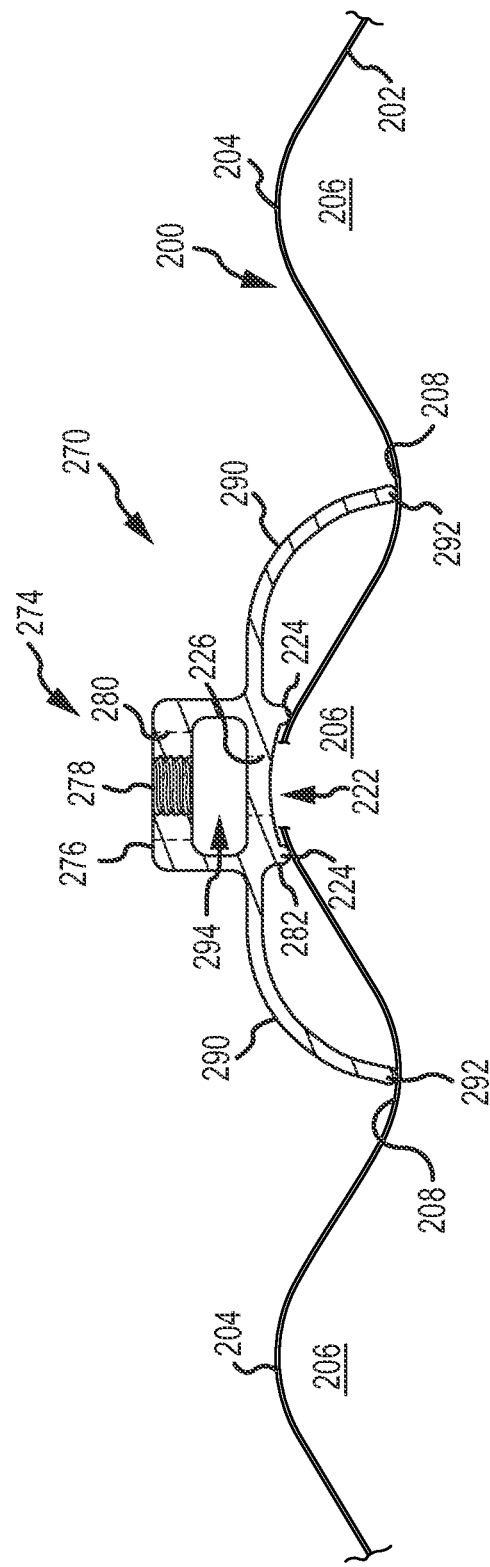
FIG. 15B is a cross-sectional view of the mounting bracket of FIG. 15A, and when positioned on a corrugated panel.

Another embodiment of a mounting device that is adapted for use with corrugated panels is illustrated in FIGS. 15A-B, and may be used to install various types of attachments on such corrugated panels, including in the various installation configurations discussed above in relation to FIGS. 12D-H. The mounting device shown in FIGS. 15A-B is in the form of a mounting bracket 270 that may be of one-piece construction (e.g., no joint of any kind between any adjacent portions of the mounting bracket 270; the mounting bracket 270 is not an assembly of two or more separately-formed and separately-joined portions). In one embodiment, the mounting bracket 270 is in the form of extrusion to provide such a one-piece construction. The mounting bracket 270 may be formed from any appropriate material or combination of materials (e.g., an aluminum alloy; other metal alloys).

The mounting bracket 270 includes a crown section 274 that is positioned above a panel crown 204 when the mounting bracket 270 is positioned on a corrugated panel 202. In the illustrated embodiment, the crown section 274 includes an upper wall or mounting surface 276. The discussion presented above with regard to the upper wall 216 of the mounting bracket of FIGS. 12A-C is equally applicable to the upper wall 276 of the mounting bracket 270. In this regard, the upper wall 276 is the uppermost portion of the mounting bracket 270 when disposed in an upright position (e.g., FIG. 15B), extends between a pair of ends 272 of the mounting bracket 270, and is in the form of an at least substantially flat surface (e.g., having a rectangular perimeter in the illustrated embodiment). In one embodiment, the perimeter of the upper wall 276 defines an area of at least 2.5 inches$^2$ to provide an appropriate surface for supporting attachments of any appropriate type (as in the case of the mounting bracket 210). In this regard, the upper wall 276 includes a mounting hole 278 (threaded or un-threaded) that extends completely through this upper wall 276. Although a single mounting hole 278 is shown, multiple mounting holes could be incorporated by the upper wall 276 if required by a particular application or if otherwise desired. The discussion presented above with regard to the mounting hole(s) 218 used by the mounting bracket 210 are equally applicable to the mounting hole(s) 278 used by the mounting bracket 210.

The upper wall 276 also includes at least one bracket fastener hole 280 (two in the illustrated embodiment). Each of the bracket fastener holes 280 may be un-threaded. In the illustrated embodiment, the mounting hole 278 is located between two bracket fastener holes 280. In any case, the mounting hole 278 may be centrally located between the ends 272 of the mounting bracket 270), although such may not be required in all instances.

The above-noted bracket ends 272 may be characterized as being spaced along a length dimension of the mounting bracket 270 (e.g., the spacing between the bracket ends 272 may define the length of the mounting bracket 270). When the mounting bracket 270 is positioned on a corrugated panel 202, the length dimension of the mounting bracket 270 will be aligned or coincide with (e.g., parallel to) the length dimension of the corresponding panel crown 204 (e.g., one bracket end 272 may be at one location along the length dimension of the corresponding panel crown 204, while the opposite bracket end 272 may be at a different location along the length dimension of this same panel crown 204).

The crown section 274 further includes a panel crown engagement section 282 that is positioned below the upper wall 276 when the mounting bracket 270 is disposed in an upright position (FIG. 15B). The panel crown engagement section 282 is of the same configuration as the panel crown engagement sections 224 utilized by the mounting bracket 210 of FIGS. 12A-C. Therefore, the discussion presented above with regard to the panel crown engagement sections 224 is equally applicable to the panel crown engagement section 282.

The upper wall 276 of the mounting bracket 270 may be characterized as being disposed in overlying relation to the panel crown engagement section 282. The upper wall 276 may also be characterized as being separated from the panel crown engagement section 282 by an open space 294. In one embodiment, the vertical extent of this open space 294 (i.e., "vertical" being when the mounting bracket 270 is disposed in an upright position, and also coinciding with the dimension that is orthogonal/perpendicular to the pitch of a roofing defined by a corrugated panel 202 on which the mounting bracket 270 is positioned) is at least about ½ inch (e.g., measured in the vertical dimension when the mounting bracket 270 is disposed in an upright position). That is, the underside of the upper wall 276 may be separated from the upper surface panel valley engagement section 282 by a distance of at least about ½ inch.

The mounting hole 278 in the upper wall 276 may be characterized as being aligned in the vertical dimension with the panel crown engagement section 282 when the mounting bracket 270 is disposed in an upright position. The open space 294 also therefore exists between the mounting hole 278 and the panel crown engagement section 282 (e.g., the open space 294 may be characterized as being below the mounting hole 278). As such, an attachment fastener may be directed within the mounting hole 278, may extend through the upper wall 276, and may terminate within the open space 294. That is, such an attachment fastener could extend beyond the underside of the upper wall 276 a distance of at least about ½" in the above-noted embodiment before contacting another portion of the mounting bracket 210 (e.g., the upper surface of the panel crown engagement section 282—the surface of the panel crown engagement section 282 that is opposite that which interfaces with a panel crown 204 when the mounting bracket 270 is positioned on a corrugated panel 202).

Two panel valley engagement sections 290 are also utilized by the mounting bracket 270 of FIGS. 15A-B. One panel valley engagement section 290 extends from one side of the crown section 274 of the mounting bracket 270. The other panel valley engagement section 290 extends from an opposite side of the crown section 274. Each panel valley engagement section 290 may be characterized as extending both downwardly and away from its corresponding side of the crown section 274 (the panel crown engagement section 282 in the illustrated embodiment) when the mounting bracket 270 is in an upright position (e.g., FIG. 15B). Another characterization is that one panel valley engagement section 290 extends from one side of the crown section 274 (the panel crown engagement section 282 in the illustrated embodiment) at least generally in the direction of one panel valley 208 of a corrugated panel 202 on which the mounting bracket 270 is positioned, while the other panel valley engagement section 290 extends from the opposite side of the crown section 274 (the panel crown engagement section 282 in the illustrated embodiment) at least generally in the direction of another panel valley 208 of a corrugated panel 202 on which the mounting bracket 270 is positioned. In the illustrated embodiment, each panel valley engagement section 290 engages the adjacent-most panel valley 208 to the panel crown 204 contacted by the panel crown engagement section 282 of the mounting bracket 270, although such may not be required in all instances.

Each panel valley engagement section 292 may be of any appropriate configuration. In the illustrated embodiment, each panel valley engagement section 292 initially proceeds at least generally horizontally from the crown section 274 (when the mounting bracket 270 is disposed in an upright position—FIG. 15B) and then curves downwardly or in the direction of the underlying panel valley 208 of the corrugated panel 202 on which the mounting bracket 270 is positioned. A free end 292 of each panel valley engagement section 292 engages a corresponding panel valley 208 of the corrugated panel 202 on which the mounting bracket 270 is positioned. In the illustrated embodiment, each such free end 292 is convex or rounded. The free end 292 of each panel valley engagement section 290 is offset or spaced in the vertical dimension from the panel crown engagement section 282. Stated another way and when the mounting bracket 270 is disposed in an upright position, the free end 292 of each panel valley engagement section 290 is disposed at a different elevation than each panel crown engagement section 282. Moreover, the panel crown engagement section 282 is offset from the free end 292 of each panel valley engagement section 290 in a lateral dimension that is orthogonal to the above-noted vertical dimension (e.g., the horizontal dimension in the view of FIG. 15B).

Figure 16:
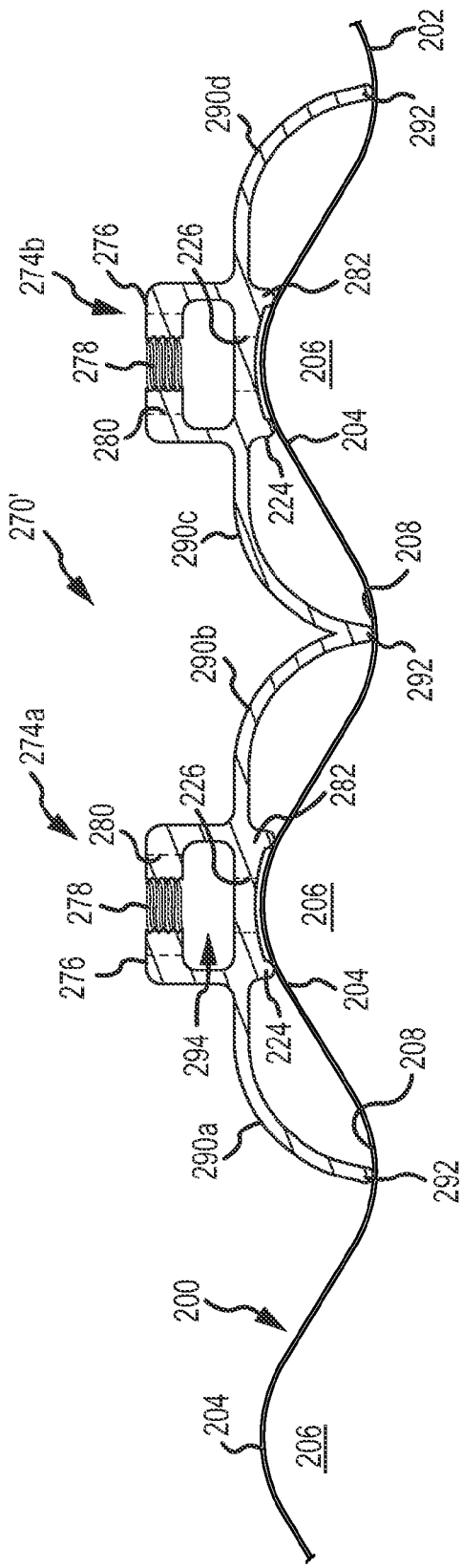
FIG. 16 is a cross-sectional view of a variation of the mounting bracket of FIGS. 15A-B, and when positioned on a corrugated panel.

A variation of the mounting bracket 270 of FIGS. 15A-B is presented in FIG. 16. Corresponding components of these two embodiments are identified by the same reference numerals, and the discussion presented above remains applicable unless otherwise noted. Those corresponding components that differ in at least some respect are identified by a "single prime" designation. In the case of the mounting bracket 270' of FIG. 16, basically two of the above-described mounting brackets 270 have been combined into a single unit to provide two crown sections 274a, 274b, each having an upper wall 276 and an underlying panel crown engagement section 282. One panel valley engagement section 290a extends from one side of the crown section 274a, while another panel valley engagement section 290b extends from the opposite side of the crown section 274a. Similarly, one panel valley engagement section 290c extends from one side of the crown section 274b, while another panel valley engagement section 290d extends from the opposite side of the crown section 274b. The panel valley engagement section 290b (associated with the crown section 274a) merges with the panel valley engagement section 290c (associated with the crown section 274b) to define a free end 292 that may contact a corresponding panel valley 208, and may be characterized as a single panel valley engagement section that is interconnected with each of the crown sections 274a, 274b. The mounting bracket 270' may be used in the various installation configurations discussed above in relation to FIGS. 12D-H.

The FIG. 16 configuration could also be modified to use only a single panel valley engagement section (collectively defined by the panel valley engagement sections 290a and 290b that merge to define a single free end 292), along with the two crown sections 274a, 274b. That is, the panel valley engagement sections 290a and 290d of the mounting bracket 270' could be eliminated for this variation.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A mounting bracket for corrugated panels, comprising:
an upper wall comprising a mounting hole that extends completely through said upper wall;
a valley section, which in turn comprises said upper wall;
first and second legs that extend from opposite sides of said valley section, wherein said upper wall and said first and second legs collectively define a hollow interior;
a third leg that extends from said first leg within said hollow interior;
a fourth leg that extends from said second leg within said hollow interior;
a first panel valley engagement section, wherein an intersection of said third and fourth legs within said hollow interior defines said first panel valley engagement section, wherein an included angle between said third and fourth legs is less than 90°, wherein an underside of said upper wall and said panel valley engagement section are separated by a distance of at least about 1" in said vertical dimension, with a first open space extending from said underside of said upper wall to said panel valley engagement section; and
at least one panel crown engagement section, wherein said first panel valley engagement section is positioned to engage a panel valley of a corrugated panel, said valley section of said mounting bracket is aligned with and spaced above the panel valley of the corrugated panel, and each said panel crown engagement section is positioned to engage a panel crown of a corrugated panel, all when said mounting bracket is positioned on the corrugated panel.

2. A mounting bracket for corrugated panels, comprising:
an upper wall comprising a mounting hole that extends completely through said upper wall;
a valley section, which in turn comprises said upper wall;
first and second panel crown engagement sections;
a first leg that extends from said first panel crown engagement section to a first side of said valley section;
a second leg that extends from said second panel crown engagement section to a second side of said valley section that is opposite of said first side;
a first panel valley engagement section;
a third leg that extends from said first panel valley engagement section to said first leg; and
a fourth leg that extends from said first panel valley engagement section to said second leg;
wherein when said first and second panel crown engagement sections are positioned on a first reference plane to dispose said mounting bracket in an upright position:
a) said first and second panel crown engagement sections are spaced from one another in a lateral dimension that coincides with said first reference plane;
b) said valley section is positioned above said first reference plane and is spaced upwardly relative to each of said first and second crown engagement sections;
c) said valley section is located between said first panel crown engagement section and said second panel crown engagement section in said lateral dimension and furthermore is spaced from each of said first and second panel crown engagement sections in said lateral dimension;
d) said first panel valley engagement section is located between said first panel crown engagement section and said second panel crown engagement section in said lateral dimension and furthermore is spaced from each of said first and second panel crown engagement sections in said lateral dimension;
e) said first panel valley engagement section is positioned below said first reference plane;
f) said third leg extends from said first panel valley engagement section and proceeds through said first reference plane to intersect said first leg at a location that is spaced above said first reference plane and that is also spaced further from said first reference plane than an entirety of said first panel crown engagement section;
g) said fourth leg extends from said first panel valley engagement section and proceeds through said first reference plane to intersect said second leg at a location that is spaced above said first reference plane and that is also spaced further from said first reference plane than an entirety of said second panel crown engagement section;
h) said first and second legs converge toward each other in progressing upwardly from said first and second panel crown engagement sections, respectively, to said valley section; and
i) said third and fourth legs converge toward each other in progressing downwardly from said first and second legs, respectively, to said first panel valley engagement section;

j) said first panel valley engagement section is positioned to engage a panel valley of a corrugated panel and each of said first and second panel crown engagement sections is positioned to engage a different panel crown of a corrugated panel, all when said mounting bracket is disposed on a corrugated panel in said upright position.

3. The mounting bracket of claim 2, wherein said mounting bracket is of one-piece construction.

4. The mounting bracket of claim 2, further comprising:
an open space disposed directly below said mounting hole when said mounting bracket is in said upright position.

5. The mounting bracket of claim 2, wherein said mounting bracket comprises first and second ends, wherein said upper wall extends between said first and second ends, and wherein an entirety of said upper wall is in the form of an at least substantially flat surface that incorporates said mounting hole.

6. The mounting bracket of claim 5, wherein a perimeter of said at least substantially flat surface of said upper wall defines an area of at least 2.5 in.$^2$.

7. The mounting bracket of claim 2, wherein said upper wall defines an uppermost extreme of said mounting bracket when in said upright position, wherein an entirety of said upper wall is in the form of an at least substantially flat surface that incorporates said mounting hole, and wherein a perimeter of said at least substantially flat surface defines an area of at least 2.5 in.$^2$.

8. The mounting bracket of claim 2, wherein said mounting hole is aligned with said first panel valley engagement section in a vertical dimension when said mounting bracket is in said upright position.

9. The mounting bracket of claim 2, wherein said valley section, said first leg, said second leg, said third leg, and said fourth leg collectively define a closed perimeter for a single continuous space.

10. The mounting bracket of claim 2, wherein an underside of said upper wall and said first panel valley engagement section are separated by a distance of at least about 1", with a first open space extending from said underside of said upper wall to said first panel valley engagement section.

11. The mounting bracket of claim 2, wherein said first panel valley engagement section comprises a convex panel interface surface.

12. The mounting bracket of claim 2, wherein an included angle between an underside of said upper wall and each of said first and second legs is greater than 90°.

13. The mounting bracket of claim 2, wherein said first and third legs are the mirror image of said second and fourth legs.

14. The mounting bracket of claim 2, wherein each of said first and second panel crown engagement sections comprises first and second projections that are spaced from one another and that extend along an entire length of said mounting bracket.

15. The mounting bracket of claim 14, wherein each of said first and second panel crown engagement sections comprises at least one bracket fastener hole that is disposed between its corresponding said first and second projections.

16. The mounting bracket of claim 2, wherein each of said first and second panel crown engagement sections comprises a gasket pocket.

17. The mounting bracket of claim 16, further comprising:
a separate gasket positioned within said each said gasket pocket.

18. The mounting bracket of claim 16, wherein each of said first and second panel crown engagement sections comprises first and second projections that are spaced from one another and that extend along an entire length of said mounting bracket, and wherein said first and second projections on each of said first and second panel crown engagement sections defines its corresponding said gasket pocket.

19. The mounting bracket of claim 16, wherein each of said first and second panel crown engagement sections comprises at least one bracket fastener hole that intersects with its corresponding said gasket pocket.

20. The mounting bracket of claim 16, wherein each of said first and second panel crown engagement sections comprises first and second bracket fastener holes that each intersect with its corresponding said gasket pocket.

21. The mounting bracket of claim 2, wherein said mounting hole through said upper wall is threaded.

22. An attachment assembly comprising the mounting bracket of claim 2, and further comprising:
a corrugated panel, wherein said mounting bracket is positioned on said corrugated panel with said first panel valley engagement section of said mounting bracket being engaged with a first panel valley of said corrugated panel and with said first and second panel crown engagement sections of said mounting bracket being engaged with first and second panel crowns, respectively, of said corrugated panel;
an attachment; and
an attachment fastener that extends at least into said mounting hole on said upper wall of said mounting bracket, wherein said attachment is secured relative to said mounting bracket by said attachment fastener.

23. The attachment assembly of claim 22, further comprising:
at least one bracket fastener that secures said mounting bracket relative to said corrugated panel.

24. A photovoltaic system comprising the mounting bracket of claim 2, and further comprising:
a mounting plate positioned on said upper wall of said mounting bracket;
a clamping member comprising first and second clamping legs, said first clamping leg being engageable with a photovoltaic module and said second clamping leg being engageable with an adjacent photovoltaic module; and
a clamp fastener that extends through said clamping member, then through said mounting plate, and then at least into said mounting hole of said mounting bracket.

25. The mounting bracket of claim 2, wherein an intersection of said third and fourth legs defines said first panel valley engagement section.

26. The mounting bracket of claim 2, wherein an included angle between said third and fourth legs is less than 90°.

* * * * *